United States Patent
Sargent et al.

(10) Patent No.: US 11,824,206 B2
(45) Date of Patent: Nov. 21, 2023

(54) COMPOSITE MULTILAYERED ELECTROCATALYSTS FOR $CO_2$ REDUCTION AND ASSOCIATED METHODS

(71) Applicants: TOTAL SE, Courbevoie (FR); The Governing Council of the University of Toronto, Toronto (CA)

(72) Inventors: Edward Sargent, Toronto (CA); Cao-Thang Dinh, Toronto (CA); Francisco Pelayo Garcia De Arquer, Toronto (CA); Alexander Ip, Toronto (CA)

(73) Assignees: TOTAL SE, Courbevoie (FR); THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 88 days.

(21) Appl. No.: 16/959,918

(22) PCT Filed: Mar. 26, 2019

(86) PCT No.: PCT/EP2019/057573
§ 371 (c)(1),
(2) Date: Jul. 2, 2020

(87) PCT Pub. No.: WO2019/185622
PCT Pub. Date: Oct. 3, 2019

(65) Prior Publication Data
US 2021/0218036 A1    Jul. 15, 2021

Related U.S. Application Data

(60) Provisional application No. 62/648,067, filed on Mar. 26, 2018.

(51) Int. Cl.
*H01M 4/90*    (2006.01)
*H01M 4/86*    (2006.01)
(Continued)

(52) U.S. Cl.
CPC ......... *H01M 4/9016* (2013.01); *H01M 4/861* (2013.01); *H01M 4/8807* (2013.01);
(Continued)

(58) Field of Classification Search
CPC ............. H01M 4/9016; H01M 4/9025; H01M 4/9033; H01M 4/90; H01M 4/861;
(Continued)

(56) References Cited

U.S. PATENT DOCUMENTS

2011/0143254 A1    6/2011    Kongkanand et al.
2015/0044593 A1*   2/2015    Tanuma .............. H01M 8/0243
                                                  429/481

FOREIGN PATENT DOCUMENTS

DE    102016218230 A1    3/2018
JP    2004-022254    *    1/2004    .............. H01M 4/86
WO    2018232515 A1    12/2018

OTHER PUBLICATIONS

Translation of JP 2004-022254, Sugino Manabu, Fuel Cell and Manufacturing Method of Fuel Cell, Jan. 22, 2004.*
(Continued)

*Primary Examiner* — Raymond Alejandro
(74) *Attorney, Agent, or Firm* — Ewing & Jones, PLLC

(57) ABSTRACT

The invention relates to a composite multilayer carbon dioxide ($CO_2$) reduction catalyst, comprising a catalyst layer comprising at least one metal compound, the catalyst layer having opposed first and second sides; a hydrophobic gas-diffusion layer provided on the first side of the catalyst layer; a current collection structure provided on the second side of the catalyst layer. The metal is preferably copper. The invention also relates to a method for electrochemical production of a hydrocarbon product, such as ethylene, using said catalyst.

22 Claims, 40 Drawing Sheets

(51) Int. Cl.
 *H01M 4/88* (2006.01)
 *H01M 8/083* (2016.01)
 *H01M 8/1004* (2016.01)

(52) U.S. Cl.
 CPC ......... *H01M 4/9041* (2013.01); *H01M 8/083* (2013.01); *H01M 8/1004* (2013.01); *H01M 2300/0014* (2013.01)

(58) Field of Classification Search
 CPC .............. H01M 4/8605; H01M 4/8621; H01M 4/8807; H01M 4/9041; H01M 8/083; H01M 8/1004; H01M 2300/0014
 See application file for complete search history.

(56) References Cited

OTHER PUBLICATIONS

D. Ren et al., "Selective Electrochemical Reduction of Carbon Dioxide to Ethylene and Ethanol on Copper (I) Oxide Catalysts", ACS Catal., (20150000), vol. 5, doi:10.1021/cs502128q, pp. 2814-2821.

J. Wu et al., "Achieving Highly Efficient, Selective, and Atable CO2 Reduction on Nitrogen-Doped Carbon Nanotubes", ACS Nano, (20150000), vol. 9, No. 5, pp. 5364-5371.

D. Kim et al., "Electrochemical Activation of CO2 through Atomic Ordering Transformations of AuCu Nanoparticles", J. Am. Chem. Soc., (20170000), vol. 139, pp. 8329-8336.

S. Ma et al., "Electroreduction of Carbon Dioxide to Hydrocarbons Using Bimetallic Cu—Pd Catalysts with Different Mixing Patterns", J. Am. Chem. Soc., (20160000), vol. 139, pp. 47-50.

R. Kas; R. Kortlever; H. Yilmaz; M. T. M. Koper; G. Mul, "Manipulating the Hydrocarbon Selectivity of Copper Nanoparticles in CO2 Electroreduction by Process Conditions", ChemElectroChem, (20150000), vol. 2, pp. 354-358.

H. Xiao et al., "Mechanistic Explanation of the pH Dependence and Onset Potentials for Hydrocarbon Products from Electrochemical Reduction of CO on Cu (111)", J. Am. Chem. Soc., (20160000), vol. 138, pp. 483-486.

Y. Lum et al., "Optimizing C—C Coupling on Oxide-Derived Copper Catalysts for Electrochemical CO2 Reduction", J. Phys. Chem. C, (20170000), vol. 121, pp. 14191-14203.

Y. Huang et al., "Electrochemical Reduction of CO2 Using Copper Single-Crystal Surfaces: Effects of CO* Coverage on the Selective Formation of Ethylene", ACS Catal., (20170000), vol. 7, pp. 1749-1756.

M. Favaro et al., "Subsurface Oxide Plays a Critical Role in CO2 Activation by Cu(111) Surfaces to form Chemisorbed CO2, the First Step in Reduction of CO2", Proc. Natl. Acad. Sci. USA, (20170000), vol. 114, pp. 6706-6711.

C. Liu et al., "Stability and Effects of Subsurface Oxygen in Oxide-Derived Cu Catalyst for CO2 Reduction", J. Phys. Chem. C, (20170000), vol. 121, pp. 25010-25017.

International Search Report issued in Application No. PCT/EP2019/057573, dated Jun. 25, 2019; 3 pages.

* cited by examiner

COMPOSITE MULTILAYERED ELECTROCATALYSTS FOR $CO_2$ REDUCTION AND ASSOCIATED METHODS

CROSS-REFERENCE TO RELATED APPLICATIONS

This application claims the benefit of PCT/EP2019/057573 filed Mar. 26, 2019, which claims priority from U.S. 62/648,067 filed Mar. 26, 2018, which are incorporated herein by reference in their entireties for all purposes.

TECHNICAL FIELD

The technical field generally relates to catalytic methods for $CO_2$ reduction, and more particularly to composite multilayered electrocatalysts and associated methods for $CO_2$ reduction.

BACKGROUND

The efficient electrochemical conversion of carbon dioxide ($CO_2$) into valuable carbon-based fuels is desirable and technology that enhances such conversion can, for example, enable the storage of intermittent renewable electricity as well as net reductions of greenhouse gas emissions.

Electrochemical conversion of $CO_2$ into products, such as ethylene, can be performed using catalyst systems that include a catalyst and a gas-diffusion layer. Conventional catalyst systems for $CO_2$ electroreduction can have a number of disadvantages. For example, in some conventional carbon gas-diffusion layer architectures, the stability of the catalyst system is poor, notably since the carbon portion of the gas-diffusion layer floods as its hydrophobicity is lost during operation. This renders the now exposed catalyst to particle aggregation, leading to dissolution and migration over the first hours of operation in alkaline media.

There is a need for improved techniques and catalyst systems for efficient $CO_2$ reduction and related methods and systems of producing chemical compounds.

SUMMARY

According to a first aspect, the invention relates to a composite multilayer $CO_2$ reduction catalyst, comprising:
  a catalyst layer having opposed first and second sides;
  a hydrophobic gas-diffusion layer provided on the first side of the catalyst layer;
  a current collection structure provided on the second side of the catalyst layer.

In a preferred embodiment, the catalyst layer comprises at least one metal compound; with preference, the catalyst layer comprises copper (Cu); more preferably, the catalyst layer comprises or consists mainly of $Cu^0$ and $Cu^{2+}$.

Therefore, according to another definition, the invention relates to a composite multilayer carbon dioxide ($CO_2$) reduction catalyst, comprising:
  a catalyst layer comprising at least one metal compound, the catalyst layer having opposed first and second sides;
  a hydrophobic gas-diffusion layer provided on the first side of the catalyst layer;
  a current collection structure provided on the second side of the catalyst.

According to further definition, the invention relates to a composite multilayer carbon dioxide ($CO_2$) reduction catalyst, comprising:
  a catalyst layer comprising copper, the catalyst layer having opposed first and second sides;
  a hydrophobic gas-diffusion layer provided on the first side of the catalyst layer;
  a current collection structure provided on the second side of the catalyst;
with preference, the catalyst layer comprises or consists mainly of $Cu^0$ and $Cu^{2+}$; and/or the catalyst layer is or comprises copper alloys selected from CuAg, CuPd, CuAl, CuAu, and any mixture thereof.

In a preferred embodiment, the catalyst layer, the hydrophobic gas-diffusion layer, and the current collection structure have a generally flat configuration or a generally tubular configuration With preference, the catalyst layer is disposed directly on the hydrophobic gas-diffusion layer.

In a preferred embodiment, the hydrophobic gas-diffusion layer is composed of an electrically insulating material, with preference the insulating material is a polymeric material.

One or more of the following features can be used to better define the hydrophobic gas-diffusion layer:
  The hydrophobic gas-diffusion layer is composed of a fluorocarbon polymer, with preference of polytetrafluoroethylene (PTFE).
  The hydrophobic gas-diffusion layer has a porosity with pores having a diameter ranging from 0.01 to 2 micrometers as determined by scanning electron microscopy (SEM).
  The hydrophobic gas-diffusion layer has a porosity with pores having a diameter ranging from at least 50 nm as determined by scanning electron microscopy (SEM), preferably of at least 100 nm, and more preferably of at least 150 nm.
  The hydrophobic gas-diffusion layer has a porosity with pores having a diameter ranging from at most 500 nm as determined by scanning electron microscopy (SEM), preferably of at most 300 nm, and more preferably of at most 250 nm.
  The hydrophobic gas-diffusion layer has a thickness ranging between 20 and 500 micrometers as determined by scanning electron microscopy (SEM).
  The hydrophobic gas-diffusion layer has a thickness of at least 50 micrometers as determined by scanning electron microscopy (SEM), preferably of at least 100 micrometers, and more preferably of at least 150 micrometers.
  The hydrophobic gas-diffusion layer has a thickness of at most 400 micrometers as determined by scanning electron microscopy (SEM), preferably of at most 300 micrometers, and more preferably of at most 250 micrometers.

One or more of the following features can be used to better define the catalyst layer:
  The catalyst layer has a thickness ranging between 1 and 2000 nm as determined by scanning electron microscopy (SEM)
  The catalyst layer has a thickness of at least 10 nm as determined by scanning electron microscopy (SEM), preferably at least 50 nm, and more preferably of at least 100 nm.
  The catalyst layer has a thickness of at most 1500 nm as determined by scanning electron microscopy (SEM), preferably of at most 1000 nm, and more preferably of at most and 500 nm.

In an embodiment, the current collection structure has a thickness ranging between 1 to 100 micrometers, with preference a thickness ranging between 10 to 50 micrometers as determined by scanning electron microscopy (SEM)

In a preferred embodiment, the current collection structure comprises:
- a stabilization layer disposed on the catalyst layer, and
- a current collection layer disposed on the stabilization layer.

Thus, in preferred embodiments, the current collection layer is directly disposed on the stabilization layer; and/or the stabilization layer is directly disposed on the catalyst layer.

In a preferred embodiment, the stabilization layer comprises carbon nanoparticles; and/or the current collection layer comprises graphite and forms a graphite electrode layer.

The following features can be used to better define the current collection structure:
- the stabilization layer and the current collection layer are composed of different electrically conductive carbon allotropes; with preference the electrically conductive carbon allotropes are graphite, graphene and carbon nanoparticles. With preference, the carbon nanoparticles are selected from carbon nanotubes, carbon black, nanographene and any mixture thereof. More preferably, the carbon particles are carbon nanotubes and/or nanographene.
- the stabilization layer and the current collection layer are composed of different electrically conductive materials; or
- the stabilization layer and the current collection layer are composed of different electrically conductive materials; with preference, the first and second carbon compounds are carbon nanoparticles and graphite respectively.

In another embodiment, the current collection structure is composed of at least one electrically conductive carbon compound; with preference:
- at least one electrically conductive carbon compound comprises carbon nanoparticles, and/or
- at least one electrically conductive carbon compound comprises graphite, and/or
- at least one electrically conductive carbon compound comprises carbon nanoparticles and graphite having a multilayered structure.

According to a second aspect, the invention provides a method for electrochemical production of a hydrocarbon product, comprising:
a) contacting $CO_2$ gas and an electrolyte with an electrode comprising the multilayer $CO_2$ reduction composite catalyst according to the first aspect, such that the $CO_2$ gas diffuses through the hydrophobic gas-diffusion layer and contacts the catalyst layer;
b) applying a voltage to provide a current density in the current collection structure of the multilayer $CO_2$ reduction composite catalyst to cause the $CO_2$ gas contacting the catalyst layer to be electrochemically converted into the hydrocarbon product; and
c) recovering the hydrocarbon product.

In a preferred embodiment, the current density provided in the current collection structure is predetermined for selective electrochemical conversion of the $CO_2$ into a target hydrocarbon product.

With preference, the current density provided in the current collection structure is at least 100 mA/cm² for selective electrochemical conversion of the $CO_2$ into a target hydrocarbon product being ethylene. Preferably, the current density provided is between 100 mA/cm² and 1000 mA/cm², or between 250 mA/cm² and 800 mA/cm².

In an embodiment, the electrolyte comprises KOH. With preference:
- KOH is provided in a concentration between 3M and 12M, preferably between 5M and 10M, and more preferably between 6M and 9M, and/or
- the method further comprises adding KI to replace missing potassium.

According to a third aspect, the invention provides a fuel cell comprising a reaction cell receiving an electrolyte; an oxygen evolution catalyst; and a composite multilayer $CO_2$ reduction catalyst as defined in the first aspect of the invention.

In an embodiment, the oxygen evolution catalyst comprises $NiFeO_x$.

In an embodiment, the electrolyte comprises KOH. With preference, the electrolyte has a KOH concentration of 6M to 8M.

According to a fourth aspect, the invention provides a method of reducing flooding of a $CO_2$ gas-diffusion membrane used in a $CO_2$ reduction composite catalyst comprising a metal catalyst and a current collection material for converting $CO_2$ into chemical compounds, the method comprising decoupling the $CO_2$ gas-diffusion membrane from the current collection material, wherein the $CO_2$ reduction composite catalyst is according to the first aspect of the invention.

According to a fifth aspect, the invention provides the use of the composite multilayer $CO_2$ reduction catalyst according to the first aspect of the invention in a fuel cell and/or for production of a hydrocarbon product, with preference for production of ethylene.

According to a sixth aspect, the invention provides a system for $CO_2$ reduction, comprising:
- an electrolytic cell configured to receive a liquid electrolyte and $CO_2$ gas;
- an anode;
- a cathode comprising a composite multilayer $CO_2$ reduction catalyst as defined in the first aspect of the invention.

According to a seventh aspect, the invention provides a method of manufacturing a composite multilayer $CO_2$ reduction catalyst according to the first aspect of the invention, comprising:
- depositing a catalyst material onto a hydrophobic gas-diffusion layer to provide a catalyst layer thereon;
- affixing current collection material to the catalyst layer to form a current collection structure thereon, wherein the current collection structure and the hydrophobic gas-diffusion layer are decoupled such that the hydrophobic gas-diffusion layer maintains hydrophobicity during operation.

In a preferred embodiment, the method further comprises:
- coating an exposed surface of the catalyst layer with a conductive stabilization material to form a stabilization layer that is electrically connected to the catalyst material; and
- affixing a conductive material to an exposed surface of the stabilization layer to provide a current collection layer thereon, such that the current collection structure comprises the stabilization layer and the current collection layer.

With preference:
- the step of depositing the catalyst material onto the hydrophobic gas-diffusion layer is performed before coating the exposed surface of the catalyst layer with the conductive stabilization material to form a stabilization layer; and/or the step of coating of the catalyst material with the conductive stabilization material comprises spray-coating.

According to the invention, the coating of the catalyst material with the conductive stabilization material is performed to provide a stabilization layer that is sized and configured to provide uniform distribution of current density over a geometric surface of the catalyst layer.

In an embodiment, the step of depositing the catalyst material onto the hydrophobic gas-diffusion layer is performed using a physical deposition method; with preference, the physical deposition method comprises thermal evaporation or sputtering.

In an embodiment, the hydrophobic gas-diffusion layer is composed of an electrically insulating material which is a polymeric material; with preference the hydrophobic gas-diffusion layer is composed of a fluorocarbon polymer; more preferably is composed of polytetrafluoroethylene (PTFE).

Preferably, the hydrophobic gas-diffusion layer has a porosity with pores of 0.01 to 2 micrometers, more preferably of 50 nm to 500 nm, even more preferably of 100 nm to 300 nm, and most preferably of 150 nm to 250 nm.

Preferably, the hydrophobic gas-diffusion layer has a thickness between 20 and 500 micrometers, more preferably between 50 and 400 micrometers, even more preferably between 100 and 300 micrometers, and most preferably between 150 and 250 micrometers.

In an embodiment, the catalyst material comprises at least one metal compound. Preferably, the catalyst material is or comprises Cu. More preferably, the catalyst layer consists mainly of $Cu^0$ and $Cu^{2+}$.

Preferably, the step of depositing the catalyst material is performed to form a catalyst layer having a thickness between 1 and 2000 nm, more preferably between 10 and 1500 nm, even more preferably between 50 and 1000 nm, and most preferably between 100 and 500 nm.

In an embodiment, the stabilization layer and the current collection layer have a combined thickness of between 1 to 100 micrometers or of between 10 to 50 micrometers.

In an embodiment, the stabilization material is or comprises carbon nanoparticles. With preference, the stabilization material is coated over the exposed surface of the catalyst material to provide a uniform distribution of current density over a geometric surface thereof. With preference, the carbon nanoparticles are selected from carbon nanotubes, carbon black, nanographene and any mixture thereof. More preferably, the carbon nanoparticles are selected from carbon nanotubes and/or nanographene.

In an embodiment, the current collection material is or comprises graphite. With preference, the current collection material is provided with a thickness and configuration to provide both structural support to the composite multilayer $CO_2$ reduction catalyst and electron conductivity.

In an embodiment, the stabilization material and the current collection material are different electrically conductive carbon allotropes; with preference, the electrically conductive carbon allotropes are graphite and nanoparticles, including variants thereof.

In an embodiment, the stabilization material and the conductive material comprise different electrically conductive compounds. Preferably, the stabilization material consists of a first electrically conductive carbon compound and the conductive material consists of a second electrically conductive carbon compound. More preferably, wherein the first and second carbon compounds are carbon nanoparticles and graphite respectively.

In an embodiment, the catalyst layer is sized and configured to provide a catalyst-mediated abrupt reaction interface for reduction of the $CO_2$.

In an embodiment, the current collection material is or comprises graphite.

In an embodiment, the current collection material is or comprises graphite, and the graphite is applied to the catalyst layer to form a single graphite layer as the current collection structure.

According to an eight aspect, the invention provides methods, systems, uses or multilayer $CO_2$ reduction composite catalyst as defined in the first to the seventh aspect, wherein the current collection structure and the hydrophobic gas-diffusion layer are decoupled such that (i) the hydrophobic gas-diffusion layer maintains hydrophobicity during operation in alkaline electrolyte conditions for at least 20 hours, at least 24 hours, at least 50 hours, at least 100 hours, or at least 150 hours; and/or (ii) the multilayer catalyst provides a stable selectivity for production of a target hydrocarbon, such as ethylene, of at least 50%, at least 55%, at least 60%, at least 65%, or at least 70% for at least 10 hours of operation in alkaline electrolyte conditions.

In an embodiment, the target hydrocarbon is ethylene and current densities between 75 and 100 mA $cm^{-2}$ are employed.

In an embodiment, the alkaline conditions comprise KOH maintained between about 7M and 11M or between about 9M and 10.5M.

DETAILED DESCRIPTION

Techniques described herein relate to composite multilayered electrocatalysts for efficient and stable $CO_2$ reduction to form chemical products. A composite multilayered electrocatalyst was developed and includes a catalyst layer that is sandwiched in between a hydrophobic gas-diffusion layer and a current collection structure. The approach uses decoupling of the hydrophobic gas-diffusion layer from current collection requirements of traditional carbon gas-diffusion layers, enabling the electrochemical conversion of $CO_2$ to chemicals with remarkably high activity, selectivity and stability.

The Composite Multilayered Electrocatalyst (CME) and its Preparation Method

In some implementations, the composite multilayered electrocatalyst (CME) comprising:
- a catalyst layer having opposed first and second sides;
- a hydrophobic gas-diffusion layer provided on the first side of the catalyst layer;
- a current collection structure provided on the second side of the catalyst layer.

Figure 3A:
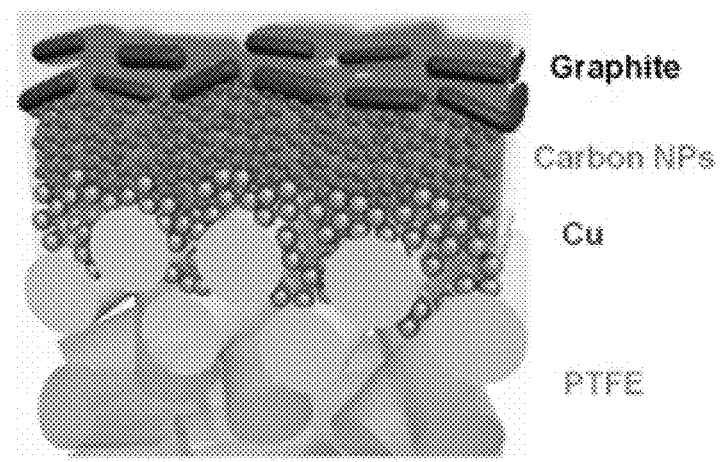
FIGS. 3a-3c are pictures depicting the structure and performance of a polymer-based gas-diffusion electrode.

In an embodiment, the multilayered catalyst includes a polymer-based gas-diffusion layer, a catalyst layer, a carbon nanoparticle layer, and a graphite layer. FIG. 3A provides an illustration of an example structure of the CME. In the CME, the polymer-based gas-diffusion layer can be decoupled and spaced away from the current collecting structure on the opposed side of the catalyst layer. In other words, the CME structure facilitates sandwiching of the abrupt reaction interface between hydrophobic and conductive supports. More details regarding the different layers and structures of the CME, which can also be referred to as a multilayer $CO_2$ reduction composite catalyst herein, will be provided further below.

Previously, it has been demonstrated that hydroxide molecules in the vicinity of a catalyst surface lower the thermodynamic energy barrier for $CO_2$ reduction and CO—CO coupling reactions, and that they do so beyond pH effects alone. This allows the generation of products derived from $CO_2$ electroreduction at extreme low overpotentials and high selectivity. While high electrochemical performance is achieved using some traditional carbon gas-diffusion layer architectures, the stability of these catalysts can be poor: the carbon portion of the gas-diffusion layer floods as its hydrophobicity is lost during operation. This renders the now exposed catalyst to particle aggregation, leading to dissolution and migration over the first hours of operation in alkaline media. Even in milder electrolytes and at lower operating currents, material restructuring over time is common and few catalysts have demonstrated sustained hydrocarbon production over one hour of operation. Standard carbon gas diffusion electrodes degrade within one hour of continuous $CO_2$RR operation regardless of catalyst thickness or electrolyte concentration alkalinity.

The CME structures and methods described herein provide advantageous functionality facilitated by various features of the CME. In one preferred implementation of the CME, it includes a hydrophobic polymer-based support (which can also be referred to as a hydrophobic gas-diffusion layer) such as polytetrafluoroethylene (PTFE); a catalyst deposited on top; a layer of carbon-based nanoparticles (NPs) atop the catalyst; and an ensuing layer of graphite as the electron conductive layer. The set of the layer of carbon-based nanoparticles (NPs) and the ensuing layer of graphite can also be referred to as a current collection structure provided on the second side of the catalyst layer.

In this configuration, the PTFE layer, which can be substantially pure PTFE or similar polymer, acts as a more stable hydrophobic gas-diffusion layer that prevents flooding from the catholyte. Carbon NPs and graphite layers stabilize the metal catalyst surface. The carbon NPs layer and the graphite layer both serve as an overall support and current collector.

In an alternative implementation, the CME includes a hydrophobic polymer-based layer; a catalyst deposited on top; and then a layer of conductive material such as graphite deposited on top of the catalyst layer. In this configuration, the stabilization material (e.g., carbon nanoparticles) are not present as a distinct layer in between the graphite and the catalyst layers.

Various drawbacks of conventional catalyst systems can be overcome by using example CMEs discussed herein. In some implementations, the gas-diffusion layer is made of pure PTFE, or similar material, that retains its hydrophobicity under operation. The change in the surface of carbon/graphite layers as current collector during alkaline operation is not detrimental to the gas diffusion (e.g., PTFE) layer. In some implementations, the gas-diffusion layer can be composed of electrically insulating material or a material with low electric conductivity.

Whatever is the configuration selected for the hydrophobic gas-diffusion layer it is preferably composed of a fluorocarbon polymer, such as polytetrafluoroethylene (PTFE). The gas-diffusion layer has a porosity with pores diameters ranging from 0.01 to 2 micrometers, preferably from 50 nm to 500 nm, more preferably from 100 nm to 300 nm, and even more preferably from 150 nm to 250 nm. With preference, the hydrophobic gas-diffusion layer has a thickness between 20 and 500 micrometers, preferably from 50 to 400 micrometers, more preferably from 100 to 300 micrometers, and even more preferably from 150 to 250 micrometers.

The PTFE layers are commercially available.

The catalyst layer comprises at least one metal compound; with preference, the catalyst layer comprises copper (Cu).

The copper can be pure copper and/or a copper alloys such as CuAg, CuPd, CuAl, CuAu, and any mixture thereof.

Thus, the composite multilayer $CO_2$ reduction catalyst, is comprising:
- a catalyst layer comprising or consisting of copper, the catalyst layer having opposed first and second sides;
- a hydrophobic gas-diffusion layer provided on the first side of the catalyst layer;
- a current collection structure provided on the second side of the catalyst layer.

In a preferred embodiment, the catalyst layer comprises or consists mainly of $Cu^0$ and $Cu^{2+}$. With preference, the catalyst layer has a thickness ranging from 1 and 2000 nm, preferably ranging from 10 to 1500 nm, more preferably ranging from 50 to 1000 nm, and even more preferably ranging from 100 to 500 nm.

The catalyst layer is configured to provide a catalyst-mediated abrupt reaction interface for the reduction of $CO_2$.

The catalyst layer is deposited onto the hydrophobic gas-diffusion layer using a physical deposition method comprising thermal evaporation or sputtering.

In an embodiment, the current collection structure comprises:
- a stabilization layer disposed on the catalyst layer, and
- a current collection layer disposed on the stabilization layer.

The stabilization layer preferably comprises carbon nanoparticles that are spray coated onto the catalyst layer. In such a configuration, wherein the stabilization layer is a distinct layer composed of a material and deposited onto the catalyst layer, the stabilization layer provides an electrical connection with the catalyst layer and uniform distribution of current density over a geometric surface thereof. With preference, the carbon nanoparticles are selected from carbon nanotubes, carbon black, nanographene and any mixture thereof. More preferably, the carbon nanoparticles are selected from carbon nanotubes and/or nanographene. The carbon nanotube can be single walled carbon nanotube and/or multiwalled carbon nanotubes.

In an embodiment the composite multilayer $CO_2$ reduction catalyst is devoid of a stabilization layer and the current collection structure comprises a current collection layer disposed on the catalyst layer.

Whatever is the embodiment selected, the current collection layer preferably comprises graphite and forms a graphite electrode layer. The current collection layer is therefore configured to provide both structural support and electron conductivity.

In an embodiment, the current collection structure is composed of at least one electrically conductive carbon compound, wherein said at least one electrically conductive carbon compound comprises carbon nanoparticles and/or graphite. Preferably, the at least one electrically conductive carbon compound comprises carbon nanoparticles and graphite having a multilayered structure.

In a preferred embodiment, the catalyst layer, the hydrophobic gas-diffusion layer, and the current collection structure have a generally flat configuration or a generally tubular configuration.

Some example features described herein that can facilitate enhanced operations are (i) an electrode configuration for $CO_2$ reduction that decouples the hydrophobic and current collection requirements of traditional carbon gas-diffusion layers; (ii) methods for coating the catalyst on PTFE layer to produce selective catalysts for $CO_2$ conversion; and (iii) addition of a carbon layer in contact with catalyst surface as a current collector improving both the selectivity and stability of the catalysts. It will be appreciated from the overall description and the experimentation section in particular that the CMEs described herein can have a number of features, variations, and applications.

EXPERIMENTATION & EXAMPLES

The following is a discussion regarding $CO_2$ electroreduction to ethylene via hydroxide-mediated copper catalysis at an abrupt interface. Experiments were conducted using catalyst systems with conductive gas-diffusion membranes that include carbon nanoparticles, as well as CMEs with gas-diffusion layers that are decoupled from the conductive layers of the composite catalyst.

The efficient electrochemical conversion of carbon dioxide ($CO_2$) into valuable carbon-based fuels and feedstocks enables the urgently-needed storage of intermittent renewable electricity and, ultimately, a net reduction of greenhouse gas emissions. Much effort has been devoted to advance the prospects of producing ethylene—a highly demanded chemical feedstock—from $CO_2$ electroreduction. The $CO_2$ reduction reaction ($CO_2$—RR) has reached lower activation overpotentials and increased Faradaic efficiencies via tuning of catalyst morphologies, manipulation of oxidation states, and introduction of dopants. For $CO_2$ conversion to ethylene, Cu-oxide catalysts have achieved peak Faradaic efficiencies of 60% by suppressing competing reactions and operating in a narrow reaction window. Separately, ethylene currents of 150 mA cm$^{-2}$ have been achieved at selectivities of 36% and potentials of −0.58 V vs. RHE on Cu nanoparticles in a flow-cell configuration using alkaline electrolytes.

Despite advancements in individual metrics (see the below table 1), large negative potentials are typically required to reach substantial ethylene selectivities, due in part to the 200-300 mV overpotential gap between the respective formation of necessary CO intermediates and ethylene. What is more, selective ethylene production has not yet been sustained at commercially-relevant current densities (>100 mA cm$^{-2}$). Stable and highly selective ethylene production at lower overpotential is urgently needed to enable the renewable-electricity-powered synthesis of fuels and feedstocks.

TABLE 1

Summary of $CO_2$ reduction to $C_2H_4$ performance on different catalysts

| Catalyst | $C_2H_4$ onset potential (V vs. RHE) | $J(C_2H_4)$ mA cm$^{-2}$ | $C_2H_4$ Faradaic efficiency (%) | $C_2H_4$ energy conversion (%)(*) | $C_2H_4$ mass activity (A mg$^{-1}$) | Reference |
|---|---|---|---|---|---|---|
| Plasma-Oxidized Cu | −0.6 | 12 | 60 | 33 | — | (17) |
| Plasma-Cu | −0.6 | 16 | 40 | 25 | — | (18) |

TABLE 1-continued

Summary of $CO_2$ reduction to $C_2H_4$ performance on different catalysts

| Catalyst | $C_2H_4$ onset potential (V vs. RHE) | $J(C_2H_4)$ mA cm$^{-2}$ | $C_2H_4$ Faradaic efficiency (%) | $C_2H_4$ energy conversion (%)[*] | $C_2H_4$ mass activity (A mg$^{-1}$) | Reference |
|---|---|---|---|---|---|---|
| Nanocubes |  |  |  |  |  |  |
| N-doped graphene dots | −0.45 | 40 | 33 | 18 | 0.08 | (19) |
| Cu nanostructure | ~ −0.3 | 100 | 40 | 23 | 0.33 | (20) |
| Cu nanodendrites | — | 97 | 55 | 28 | — | (21) |
| Cu nanoparticles | −0.36 | 150 | 36 | 23 | 0.15 | (22) |
| Abrupt Cu Interface | −0.165 | 473 | 66 | 40 | 17.8 | This work |
| Abrupt Cu Interface | −0.165 | 184 | 66 | 44 | 6.7 | This work |

[*]$C_2H_4$ energy efficiency is calculated for the half-cell (i.e. assuming the overpotential of the oxygen evolution reaction is zero). $C_2H_4$ energy efficiency = (1.23 + (−$E_{C2H4}$))*FE($C_2H_4$)/(1.23 + (−E)), where E is the applied potential vs. RHE; $E_{C2H4}$ = 0.08 V is thermodynamic potential (vs. RHE) of $CO_2$ reduction to ethylene; FE($C_2H_4$) is the measured $C_2H_4$ Faradaic efficiency in percentage.

References (17) to (22) correspond to the following previous works:

(17) D. Ren et al., Selective electrochemical reduction of carbon dioxide to ethylene and ethanol on copper (I) oxide catalysts. *ACS Catal.* 5, 2814-2821 (2015).

(18) J. Wu et al., Achieving highly efficient, selective, and stable $CO_2$ reduction on nitrogen-doped carbon nanotubes. *ACS Nano* 9, 5364-5371 (2015).

(19) D. Kim et al., Electrochemical activation of $CO_2$ through atomic ordering transformations of AuCu nanoparticles. *J. Am. Chem. Soc.* 139, 8329-8336 (2017).

(20) S. Ma et al., Electroreduction of carbon dioxide to hydrocarbons using bimetallic Cu—Pd catalysts with different mixing patterns. *J. Am. Chem. Soc.* 139, 47-50 (2016).

(21) R. Kas, R. Kortlever, H. Yilmaz, M. T. M. Koper, G. Mul, Manipulating the hydrocarbon selectivity of copper nanoparticles in $CO_2$ electroreduction by process conditions. *ChemElectroChem* 2, 354-358 (2015).

(22) H. Xiao, T. Cheng, W. A. Goddard III, R. Sundararaman, Mechanistic explanation of the pH dependence and onset potentials for hydrocarbon products from electrochemical reduction of CO on Cu (111). *J. Am. Chem. Soc.* 138, 483-486 (2016).

Experimental and theoretical insights were pursued into the direct influence of hydroxide (OH$^-$) ions, as distinct from bulk pH effects alone, on $CO_2$ reduction at a Cu catalyst surface. In $CO_2$ reduction applications, metal-oxides have been proposed as active sites even when present in residual or subsurface form. Hydroxide ions adsorbed or proximate to metal catalysts may play a similar role in modulating active catalytic sites. Further, the reaction rate of the competing hydrogen evolution reaction is suppressed in alkaline electrolytes due to slow kinetics of the first water-reduction step (Volmer), lowering adsorbed hydrogen surface coverage and influencing the subsequent Heyrovsky and Tafel steps.

The direct molecular effects of hydroxide on $CO_2$ reduction have yet to be studied in detail, in part because canonical H-shaped electrochemical architectures (H-cells) are limited by the low availability of $CO_2$ at pH>10 in aqueous electrolytes. $CO_2$ dissolved in an alkaline electrolyte will then rapidly react, forming a neutral pH carbonate mixture. Although high pH conditions can be locally generated in H-cells via rapid proton consumption (first from proton reduction, then from water reduction), this operation provides information about production at high currents, and does not directly elucidate $CO_2$ reduction onset potentials.

In contrast, a gas-diffusion layer positioned immediately adjacent to the catalyst layer allows for $CO_2$ to diffuse a short distance to the catalyst surface and react before it is converted to bicarbonate. Thus, it is possible for $CO_2$ reduction to occur under alkaline conditions. It was considered that a flow-cell in which the catalyst is deposited onto a gas-diffusion layer has the potential to increase dramatically the local concentration of gaseous $CO_2$ and enable clarification of the influence of hydroxides in $CO_2$—RR.

Figure 1A:
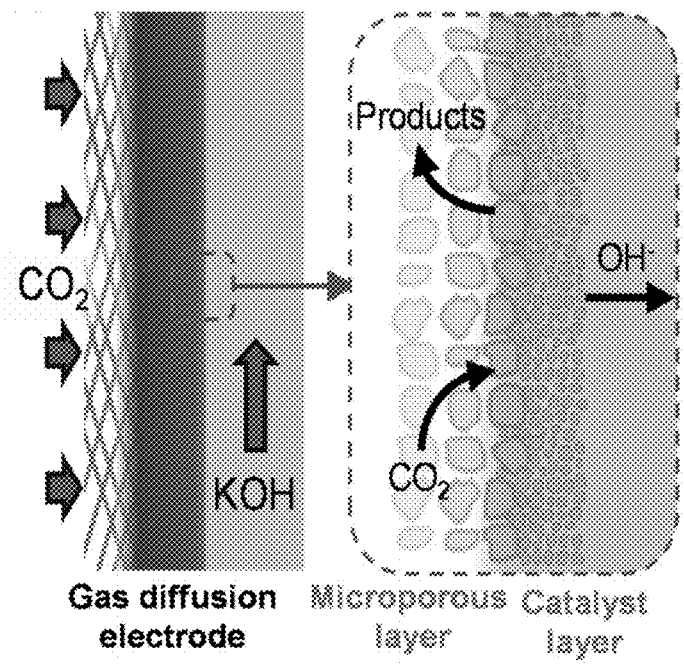
FIG. 1a is a graphical depiction of a Cu catalyst deposited onto a carbon gas-diffusion layer allowing $CO_2$ reduction with diffusion of $CO_2$ across the gas-liquid interface.

Experiments were conducted to analyze the effects of the electrolyte concentration for the inventive catalyst For examples 1A to 1C a 100-nm thick Cu catalyst was deposited onto a carbon gas-diffusion layer (see FIG. 5), allowing $CO_2$ reduction under extreme alkaline conditions with the benefit of diffusion of $CO_2$ across the gas-liquid interface (see FIG. 1A). Under an argon (Ar) environment, the onset potential for H2 remained relatively constant in the KOH concentration range of 1 M to 10 M (see FIG. 1B). Example 1A was performed at a KOH concentration of 1M. Example 1B was performed at a KOH concentration of 5M. Example 1C was performed at a KOH concentration of 10M.

Figure 1B:
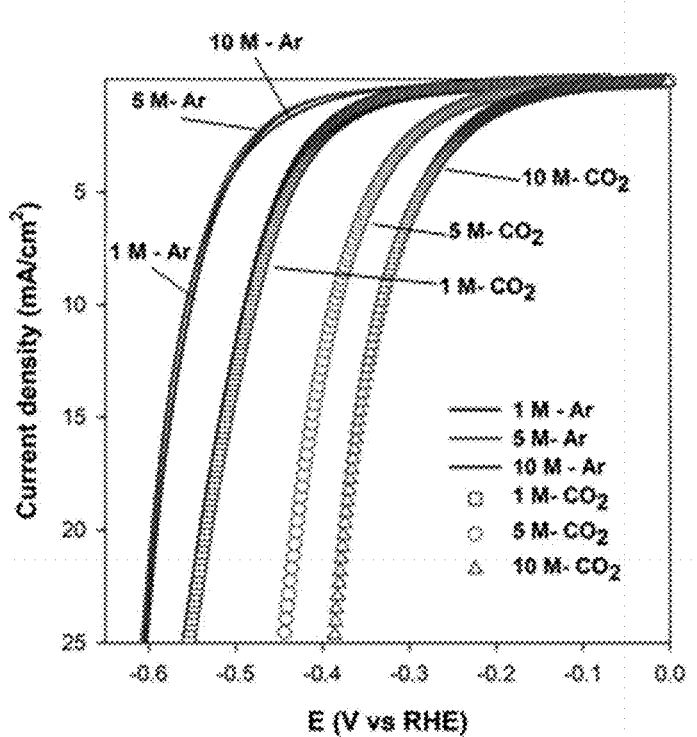
FIGS. 1b-1e are graphs depicting experimental studies of the effect of hydroxide on $CO_2$ reduction, hydrogen evolution and CO—CO coupling.

Under a $CO_2$ environment, the onset potential for $CO_2$—RR shifted significantly to more positive potentials with increasing KOH concentrations (see FIG. 1B). A similar experiment on a hydrogen-evolving catalyst showed only a minor anodic shift when Ar is replaced by $CO_2$ (see FIG. 6), agreeing well with the applied Nernst shift as predicted by a reaction-diffusion model (FIG. 7). In 10 M KOH, formation of CO was then observed 140 mV lower in potential, occurring close to the thermodynamic potential of −0.11 V vs. RHE (FIG. 1C) and reaching >50% selectivity at −0.18 V. Remarkably, ethylene formation in 10 M KOH occurred at similar potentials: ethylene was detected at applied potentials as low as −0.165 V vs. RHE, only 0.245 V higher than the thermodynamic $CO_2$-to-ethylene electroreduction potential. This observation is in contrast to other findings in 1 M KOH and prior reports in which the onset potentials of CO and $C_2H_4$ formation were separated by fully 200 to 300 mV (12, 24), with one reported ethylene onset occurring at −0.34 V vs. RHE.

Tafel analyses (FIG. 1E) of ethylene production from $CO_2$ on the Cu catalyst gave slopes of 135 and 65 mV $dec^{-1}$ in 1 M and 10 M KOH, respectively. Interestingly, similar slopes for ethylene were also observed on the Cu catalyst in CO reduction, suggesting that the increased hydroxide concentration changes the overall rate-determining step. In contrast with the case of $CO_2$—RR, however, the ethylene onset potential when produced directly from CO does not shift to lower potentials, implying a further and distinct effect of hydroxide on reaction kinetics.

Figure 1C:
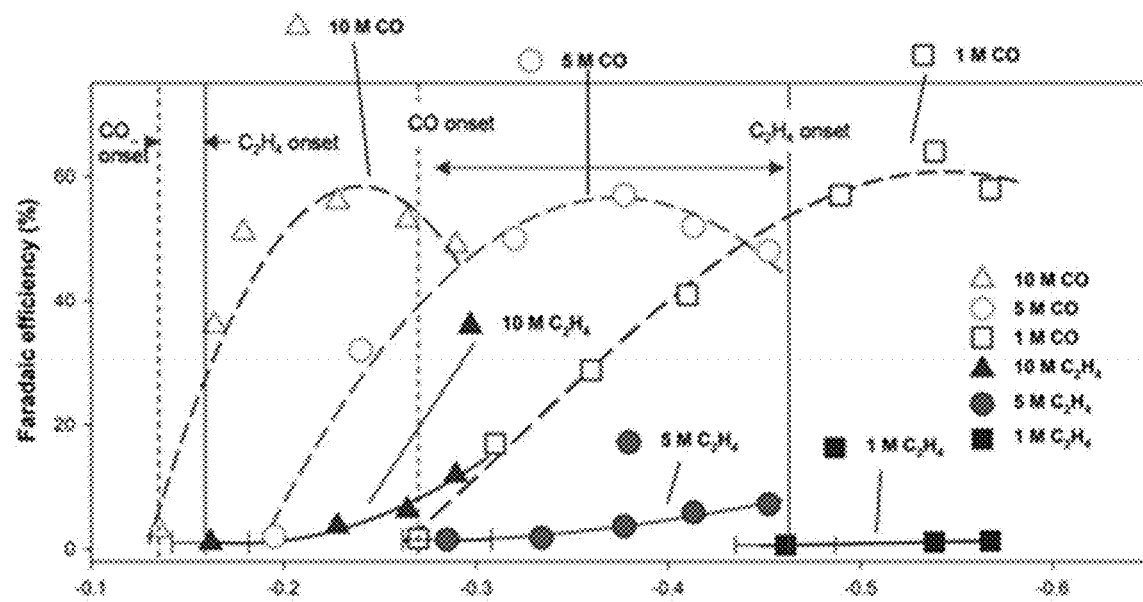

In $CO_2$—RR the onset potential gap between CO and $C_2H_4$ is attributed to the need to build up *CO coverage across the catalyst surface before CO dimerization becomes energetically favorable. As electrolyte pH is increased the penetration distance of $CO_2$ into the electrolyte is significantly diminished through direct interaction with hydroxide molecules—a point revealed from a reaction-diffusion model analysis (FIG. 1D) analogous to studies presented in prior reports. In 10 M KOH, the $CO_2$ present in the electrolyte resides substantially within the first 120 nm of the catalyst layer. This requires $CO_2$ reduction to take place near an abrupt reaction interface, in contrast with the more distributed reaction interface feasible when operating in 1 M KOH. With little competition from $H_2$ at these potentials (FIG. 1B), the more localized, hence concentrated, $CO_2$ reaction intensity boosts *CO coverage even at modestly negative potentials. This improves the reaction kinetics for CO dimerization. This hydroxide-mediated abrupt reaction interface then kinetically allows CO and $C_2H_4$ to form at similarly low potentials (FIG. 1C). The observed 300 mV shift in ethylene formation from 1 M to 10 M KOH is also larger than the pH-dependent shift (59.1 mV/pH) observed both experimentally and theoretically for CO reduction to ethylene where the initial $CO_2$-to-CO step is avoided.

The catalyst was characterized during and after $CO_2$—RR in different electrolytes. Scanning electron microscopy (SEM), transmission electron microscopy (TEM) and in-situ X-ray absorption spectroscopy (XAS) were employed. In-situ XAS of 100 nm samples showed that at the open-circuit potential Cu becomes oxidized when submerged in 5 M KOH, most likely via formation of surface hydroxides. However, when a negative potential of −0.16 V or −0.96 V vs. RHE is applied, the observed spectra closely match those of fully-reduced pristine Cu foil. It was concluded that, under the applied reducing potential used during $CO_2$—RR, the surface is primarily $Cu^0$ and remains consistent over the range of potentials and concentrations of interest. The SEM and TEM characterization of the sample after $CO_2$—RR in 1, 5, and 10 M KOH electrolyte showed similar Cu morphology and crystalline structure, from which we argue that structure morphology is not playing a predominant role in the enhanced $CO_2$—RR we observed in high KOH concentrations (FIG. 5).

To supplement these experimental findings, Density Functional Theory (DFT) was used to assess the impact of hydroxide ions on the thermodynamic and activation energy barriers of the CO dimerization step. CO dimerization is the rate determining step for C2 products at high pH and low applied potentials. This analysis was performed on Cu (111), (100) and (110) surfaces, including explicit water molecules in the computational studies (FIG. 12, Table 2).

TABLE 2

Physical properties of KOH electrolyte and its effect on the $C_2H_4$ onset potential and Tafel slope.

| KOH concentration (M) | Resistance (Ω) (*) | Surface pH (**) | $C_2H_4$ onset potential (V vs. RHE) (†) | $C_2H_4$ Tafel slope (mV $dec^{-1}$) (‡) |
|---|---|---|---|---|
| Ex 1A | 1 | 2.58 | 12.42 | −0.465 | 135 |
| Ex 1B | 5 | 1.08 | 14.48 | −0.285 | 97 |
| Ex 1C | 10 | 0.98 | 14.94 | −0.165 | 65 |

(*) Measured using electrochemical impedance spectroscopy (EIS);
(**) Surface pH predicted using a 1D reaction-diffusion model at 0 mA/$cm^2$ accounting for the effect of $CO_2$ gas in the catalyst layer;
(†) The potential at which the catalyst shows an ethylene faradaic efficiency of 1%;
(‡) Calculated based on the experimental $C_2H_4$ partial current densities.

The DFT results suggest that the presence of hydroxide lowers the binding energy of CO on the Cu surface. On all surfaces, hydroxide is found to also increase the charge imbalance between carbon atoms in adsorbed OCCO, further stabilizing this intermediate through a stronger dipole attraction within OCCO. The combined differences lead to an overall decrease in the activation energy barrier for the CO dimerization step, lowering the energy barrier by 156 meV on Cu (100) with an $OH^-$ surface coverage of 2/16 ML.

Figure 1D:
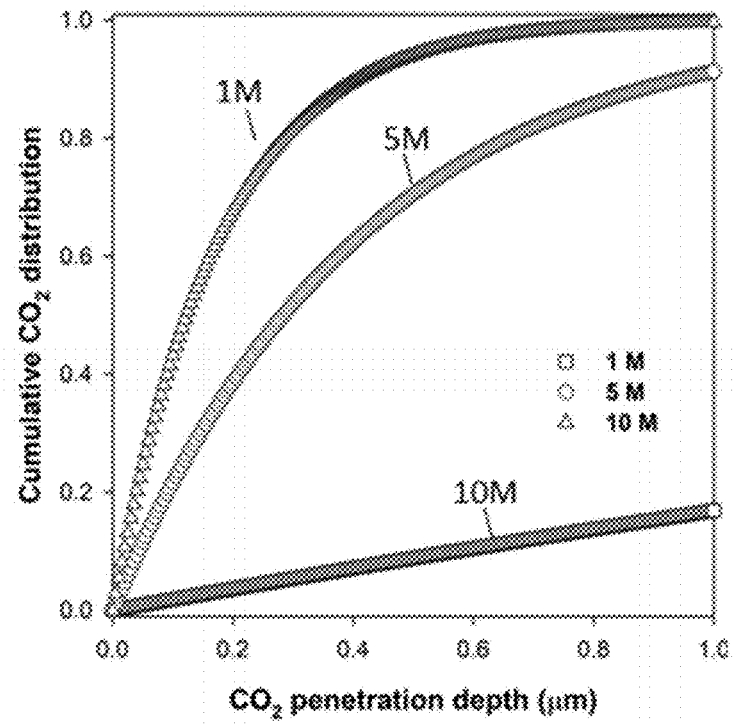
Figure 1E:
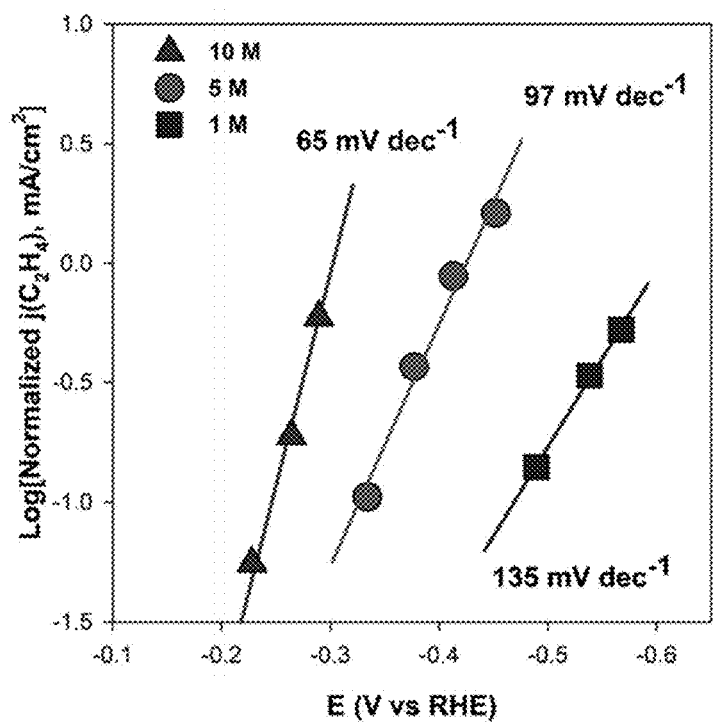

With the decreased Tafel slope and matching onset potentials of CO and $C_2H_4$ in 10 M KOH, high ethylene selectivities at low overpotentials become feasible. By increasing the reaction rate over a fixed electrochemically active surface area, one can control the relative kinetics of CO desorption and dimerization to drive ethylene formation. As seen in FIG. 1D, the abrupt reaction interface and the use of high KOH concentrations contribute to achieving this goal by limiting $CO_2$ penetration to a fraction of the catalyst layer, reducing the specific active area where $CO_2$—RR occurs. Therefore, it was sought to similarly constrain the electrochemically active surface area of the catalyst layer by using thermal evaporation to tune the thickness of the $CO_2$ reduction interface in the flow-cell configuration (FIG. 1A).

Figure 9A:
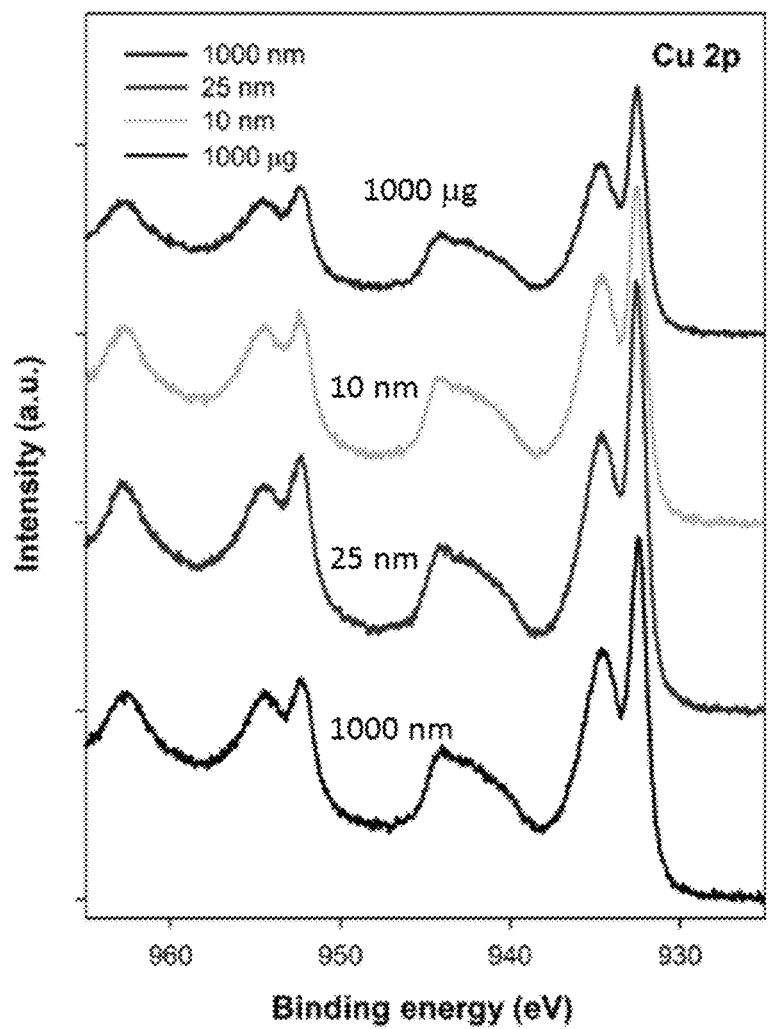
FIGS. 9a and 9b are graphs depicting the chemical and physical characterization of Cu catalysts.
Figure 9B:
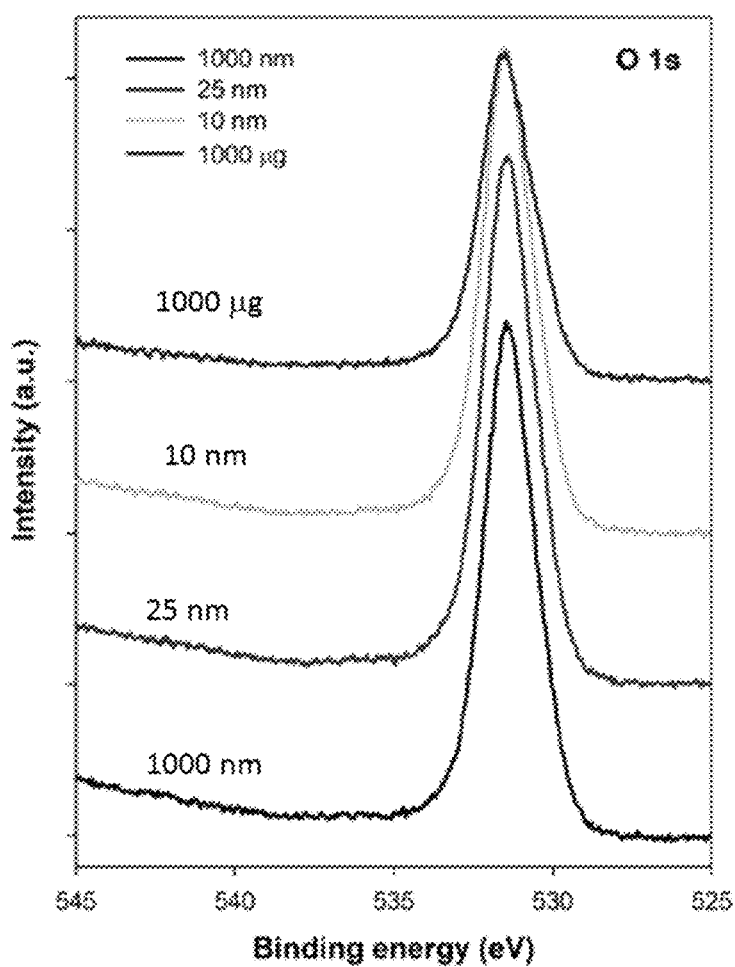
Figure 10A:
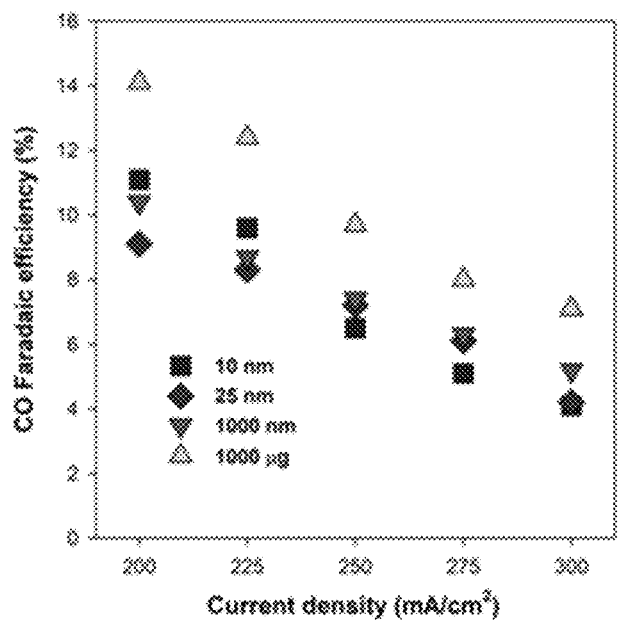
FIG. 10a-10d are graphs depicting the performance of Cu catalysts in a 10 M KOH electrolyte.
Figure 10B:
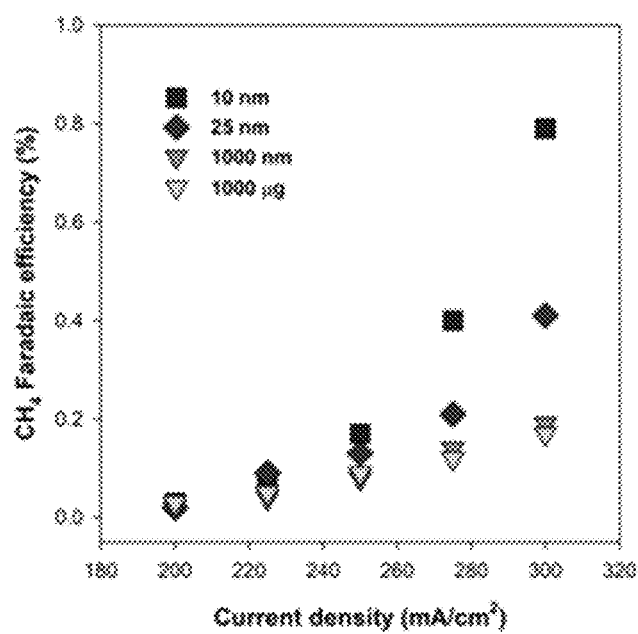
Figure 10C:
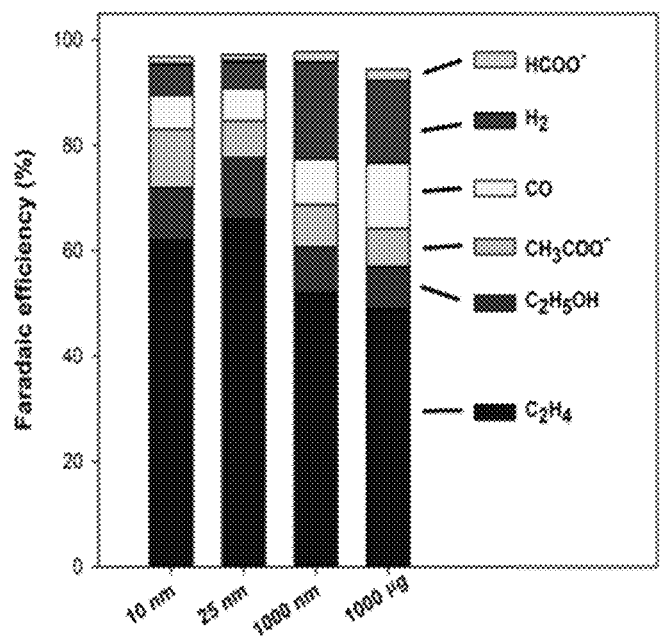
Figure 10D:
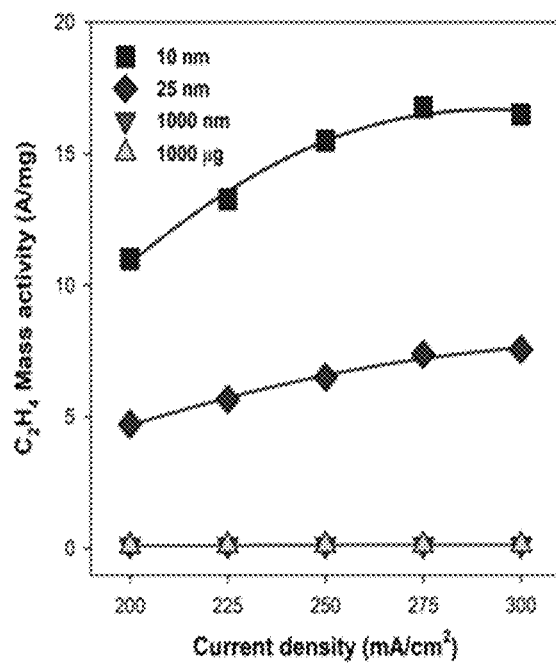

Deposition thicknesses of 10 and 25 nm was used and compared with a thermally deposited thickness of 1000 nm, all deposited on a carbon gas-diffusion layer. For further comparison, commercial Cu nanoparticles (particle size <50 nm) were deposited at a loading of 1000 μg/$cm^2$ using a drop-casting technique. Nanoparticle size and surface morphology was characterized using SEM and scanning transmission electron microscopy (STEM) for particle sizes ranging from 15 to 40 nm. Ex-situ x-ray photoelectron spectroscopy (XPS) of all three samples showed the presence of C, Cu, and O (FIG. 9). The Cu peaks indicated a mixture of metallic Cu and $Cu^{2+}$. X-ray powder diffraction confirmed the crystalline structure of the samples. The catalyst loadings, analyzed using inductively coupled plasma mass spectrometry (ICP-MS), were about 11, 28 and 1100 μg for the thermally deposited 10, 25 and 1000 nm samples, respectively. In $CO_2$—RR tests in an H-cell configuration using 0.1 M $KHCO_3$ electrolyte, these samples exhibited comparable $C_2H_4$ Faradaic efficiency to reported Cu and oxide-derived Cu catalysts (Table 3)

TABLE 3

CO₂ reduction to ethylene stabilities reported in Literature compared to the invention.

| Catalyst | Reported Duration (h) | Stable $C_2H_4$ Selectivity | $C_2H_4$ Current Density (mA/cm²) | Source |
| --- | --- | --- | --- | --- |
| Cu-Nanocubes | 1 | 45% | 23 | (18) |
| Cu-Nanoparticles | 4 | 18% | 27 | (22) |
| Plasma-Cu | 5 | 58% | 7 | (17) |
| Cu-Mesocrystals | 6 | 23% | 4 | (23) |
| CuZn-Nanoparticles | 8 | ~30% | 14 | (24) |
| Oxide-derived CuZn | 10 | 8% | 3 | (25) |
| Cu-Nanocubes | 10 | 32% | 7 | (26) |
| Graphite/Cu/PTFE | 24 | 55% | 55 | example 2A |
| Graphite/Carbon NP's/Cu/PTFE | 150 | 70% | 55-70 | example 2B |

References cited correspond to the following previous works:

(17) D. Ren et al., Selective electrochemical reduction of carbon dioxide to ethylene and ethanol on copper (I) oxide catalysts. *ACS Catal.* 5, 2814-2821 (2015).

(18) J. Wu et al., Achieving highly efficient, selective, and stable $CO_2$ reduction on nitrogen-doped carbon nanotubes. *ACS Nano* 9, 5364-5371 (2015).

(22) H. Xiao, T. Cheng, W. A. Goddard III, R. Sundararaman, Mechanistic explanation of the pH dependence and onset potentials for hydrocarbon products from electrochemical reduction of CO on Cu (111). *J. Am. Chem. Soc.* 138, 483-486 (2016).

(23) Y. Lum, B. Yue, P. Lobaccaro, A. T. Bell, J. W. Ager, Optimizing C—C coupling on oxide-derived copper catalysts for electrochemical $CO_2$ reduction. *J. Phys. Chem. C* 121, 14191-14203 (2017).

(24) Y. Huang, A. D. Handoko, P. Hirunsit, B. S. Yeo, Electrochemical reduction of $CO_2$ using copper single-crystal surfaces: Effects of CO* coverage on the selective formation of ethylene. *ACS Catal.* 7, 1749-1756 (2017).

(25) M. Favaro et al., Subsurface oxide plays a critical role in $CO_2$ activation by Cu(111) surfaces to form chemisorbed $CO_2$, the first step in reduction of $CO_2$. *Proc. Natl. Acad. Sci. USA* 114, 6706-6711 (2017).

(26) C. Liu et al., Stability and effects of subsurface oxygen in oxide-derived Cu catalyst for $CO_2$ reduction. *J. Phys. Chem. C*, 121, 25010-25017 (2017).

Figure 2A:
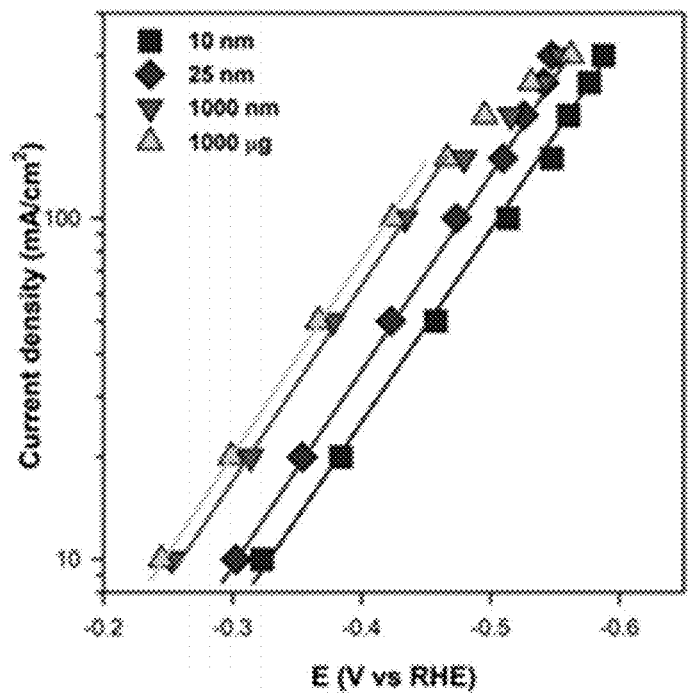
FIGS. 2a-2d are graphs depicting hydroxide-mediated $CO_2$ reduction performance on abrupt reaction interface catalysts.
Figure 2B:
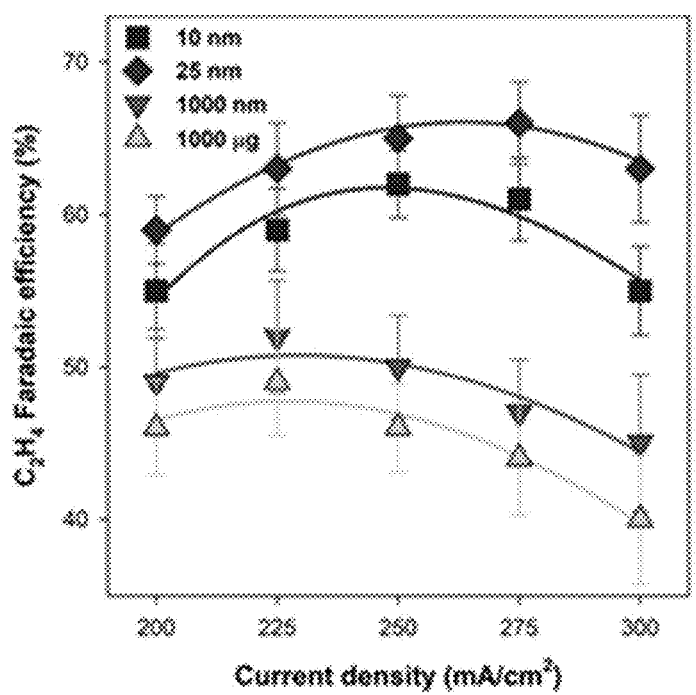

The $CO_2$—RR activities of the Cu samples were evaluated in the flow-cell reactor using 10 M KOH (FIG. 2A and FIG. 10). At less negative potentials (−0.4 V vs. RHE and closer to zero), the samples showed similar slopes, indicative of similar intrinsic activity. The two thicker samples show higher current densities at similar potentials compared to the 10 and 25 nm samples, indicating that the higher catalyst loading distributes the reaction beyond 25 nm, as predicted in FIG. 1D. At more negative potentials, however, the reaction rates on the thinner samples were higher than on the thicker samples, resulting in a similar current density at −0.54 V vs. RHE. When product selectivities in 10 M KOH were analyzed, it was found that the samples showed optimal ethylene production in the current range of 225 to 275 mA cm⁻² (FIG. 2B), since CO selectivity decreased with current density (FIG. 10). Both the 10 and 25 nm samples showed an ethylene Faradaic efficiency higher than 60%, with the 25 nm sample peaking at 66% ethylene and exhibiting ethanol at 11% and acetate at 6% (FIG. 10). Overall, the 25 nm sample showed a total C2 selectivity of 83% at 275 mA cm⁻² and a low potential of −0.54 V vs. RHE, corresponding to a half-cell ethylene conversion efficiency of 44% (Table 1). The 25 nm narrow reaction interface also enabled a high ethylene mass activity of 6.5 A mg⁻¹ (Table 1 and FIG. 10).

Figure 2C:
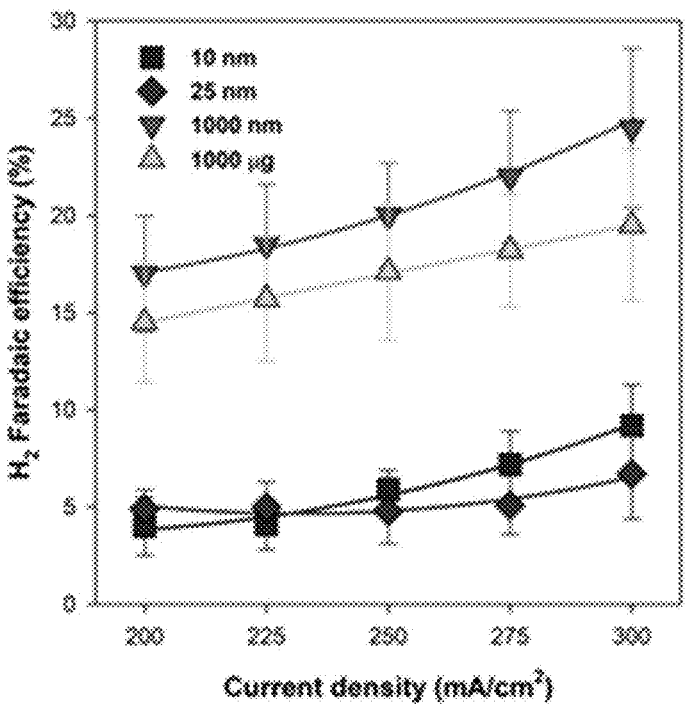

The higher $CO_2$ reduction selectivities achieved on the thinner catalyst layers were attributable in part to the fact that $H_2$ production accounted for only 5% of the partial current density compared to the >15% in the case of the 1000 nm sample (FIG. 2C). As shown in FIG. 1B, with the aid of a high $CO_2$ supply and a low applied potential, $CO_2$—RR is favored over $H_2$ evolution. At higher currents and potentials, $CO_2$—RR can also suppress $H_2$ evolution by occupying surface sites. In highly alkaline conditions, however, a portion of the 1000 nm catalyst layer is largely devoid of $CO_2$ (FIG. 1D and FIG. 7), leaving $H_2$ evolution as the only possible reaction pathway in this region at higher potentials. These results indicate the desirability to limit the thickness of the catalyst layer at higher current densities and potentials to prevent unwanted $H_2$ evolution. The effect of reduced $CO_2$ availability on $CO_2$—RR selectivity can also be observed at non-$CO_2$-limited current densities in 1 M KOH on the 25 nm sample by lowering the partial pressure of $CO_2$ in the gas-phase.

Figure 2D:
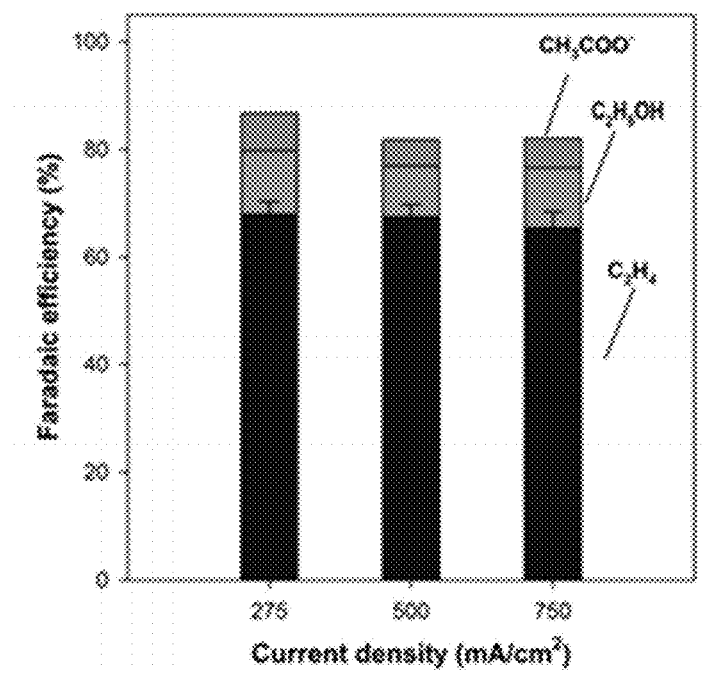
Figure 11A:
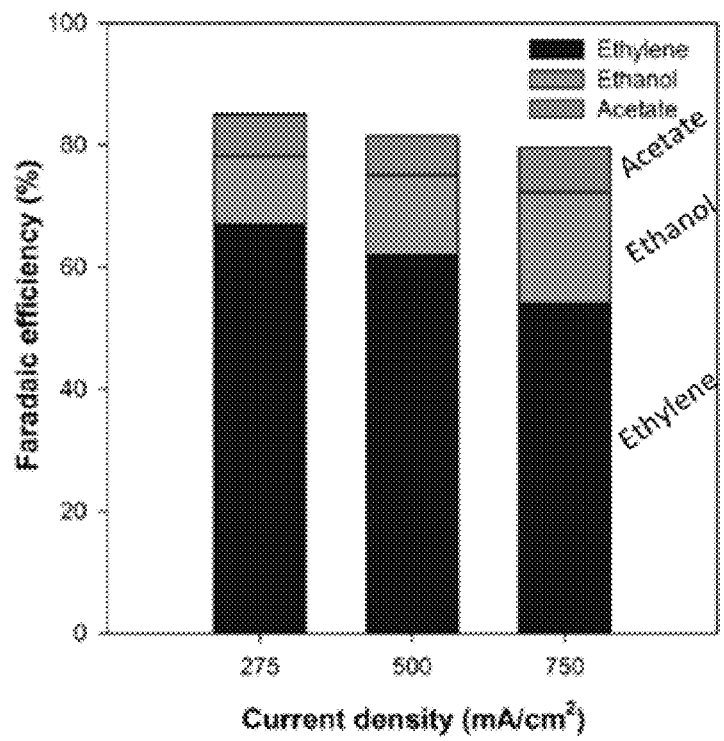
FIGS. 11a and 11b are graphs depicting $CO_2$ reduction performance on an abrupt reaction interface sample.
Figure 11B:
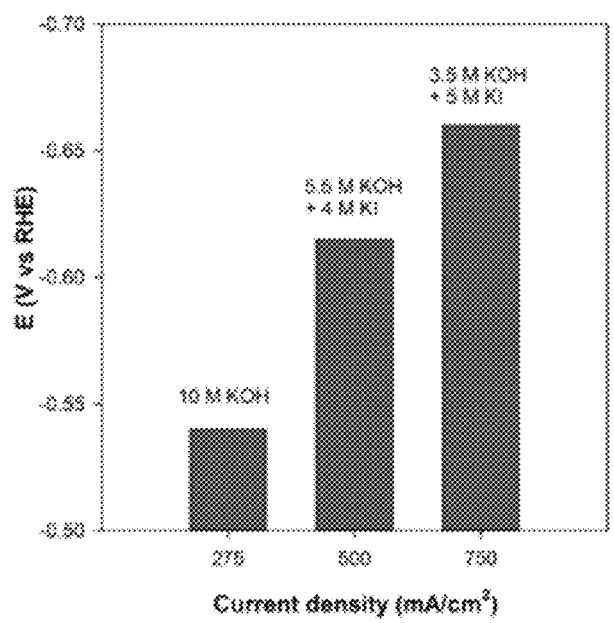
Figure 12A:
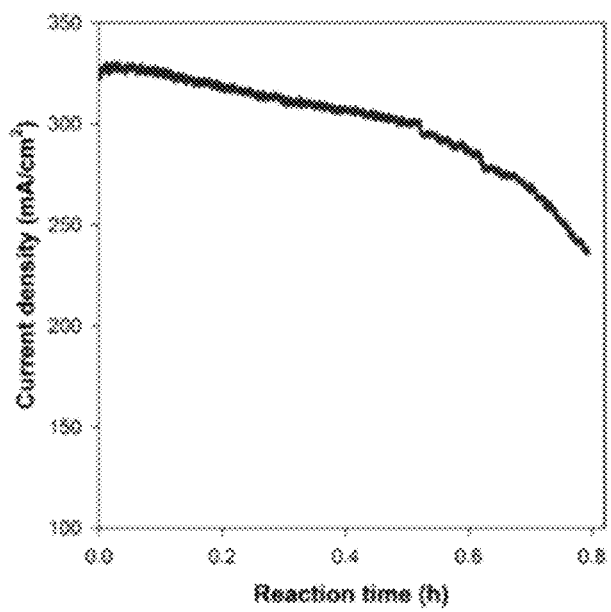
FIGS. 12a-12d are graphs depicting a stability test of the Cu catalyst deposited onto a traditional carbon gas-diffusion electrode.
Figure 12B:
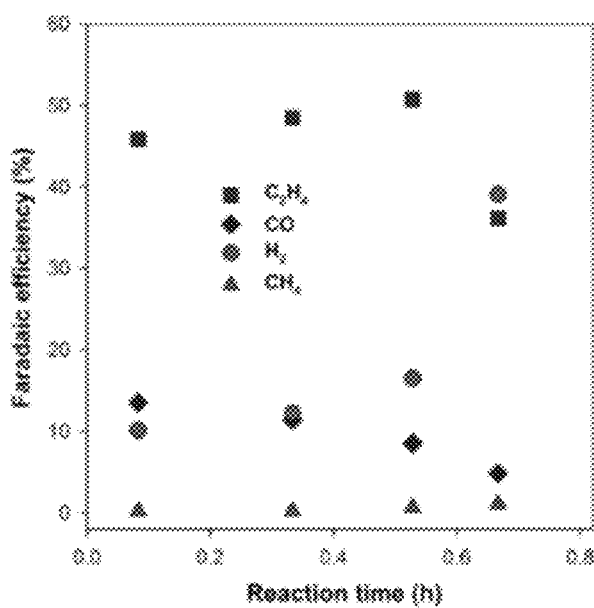
Figure 12C:
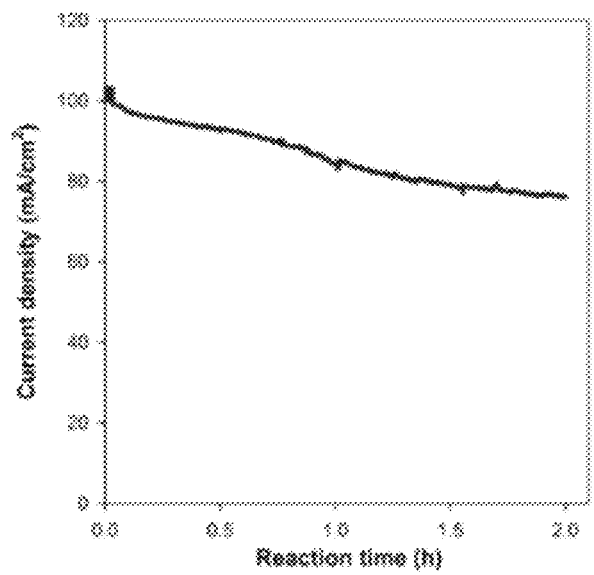
Figure 12D:
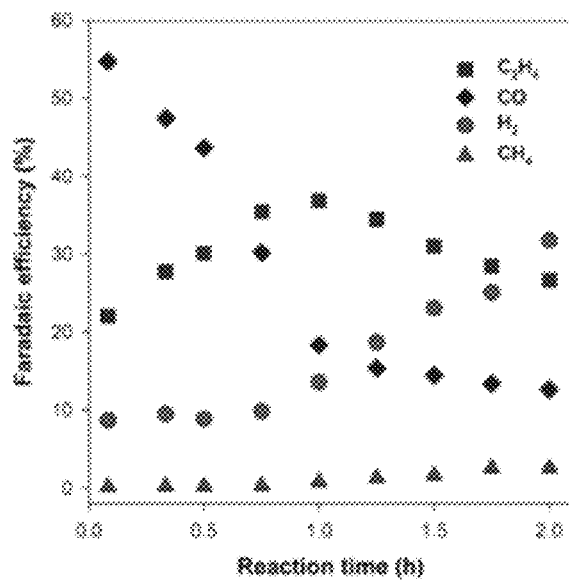
Figure 13A:
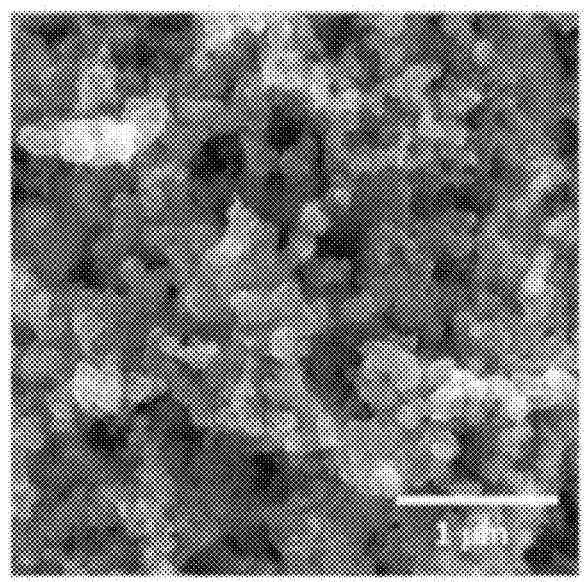
FIGS. 13a and 13b are pictures characterizing a Graphite/Carbon NPs/Cu/PTFE electrode.
Figure 13B:
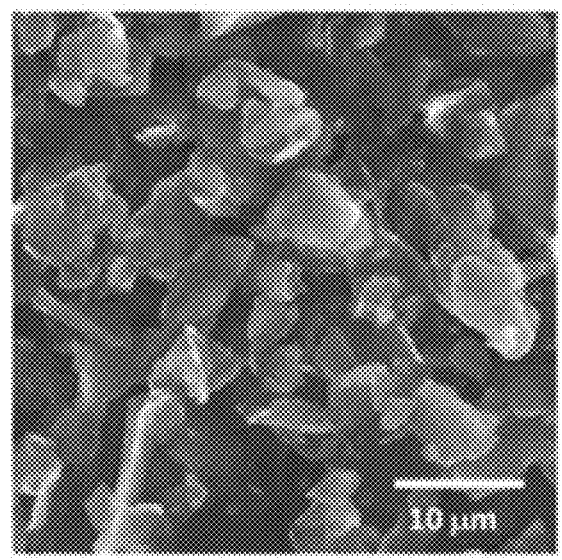
Figure 13C:
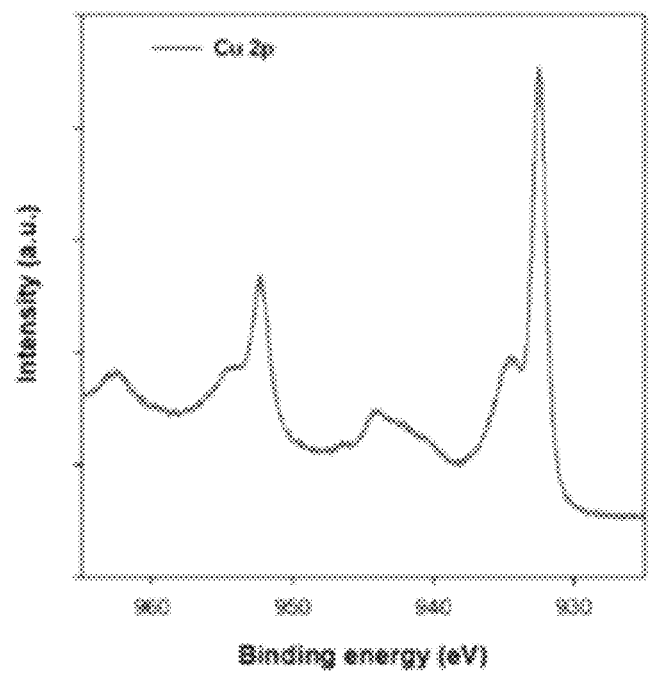
FIGS. 13c-13d are graphs characterizing a Graphite/Carbon NPs/Cu/PTFE electrode.
Figure 13D:
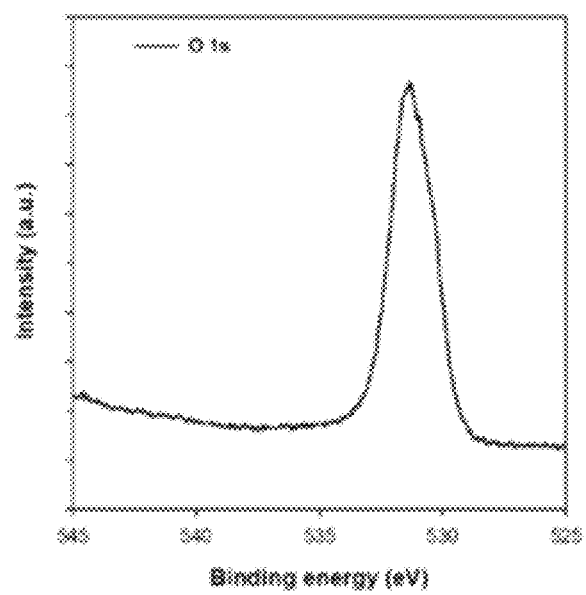
Figure 14A:
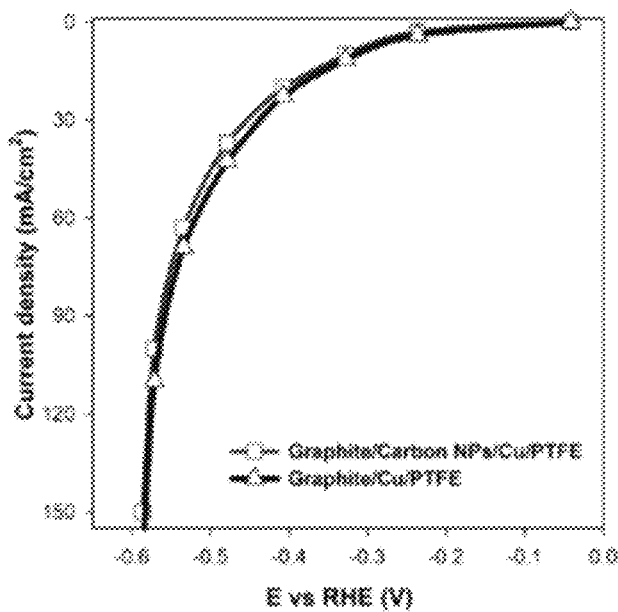
FIG. 14a-14d are graphs depicting performance of the polymer-based gas-diffusion layer electrodes in 7 M KOH electrolyte.
Figure 14B:
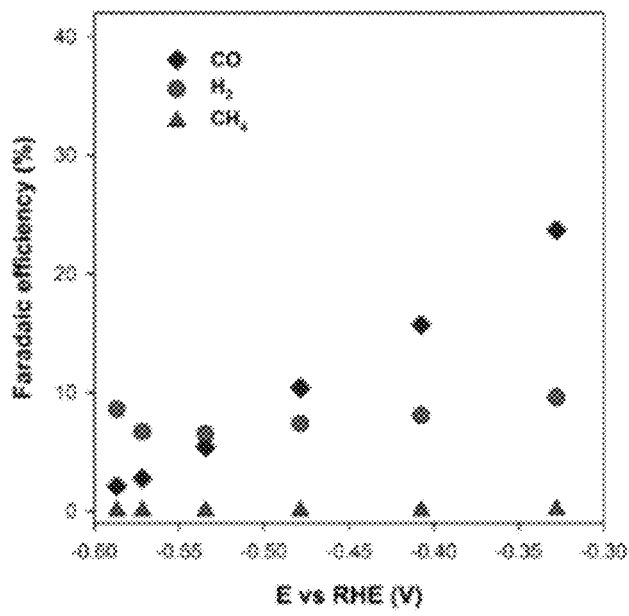
Figure 14C:
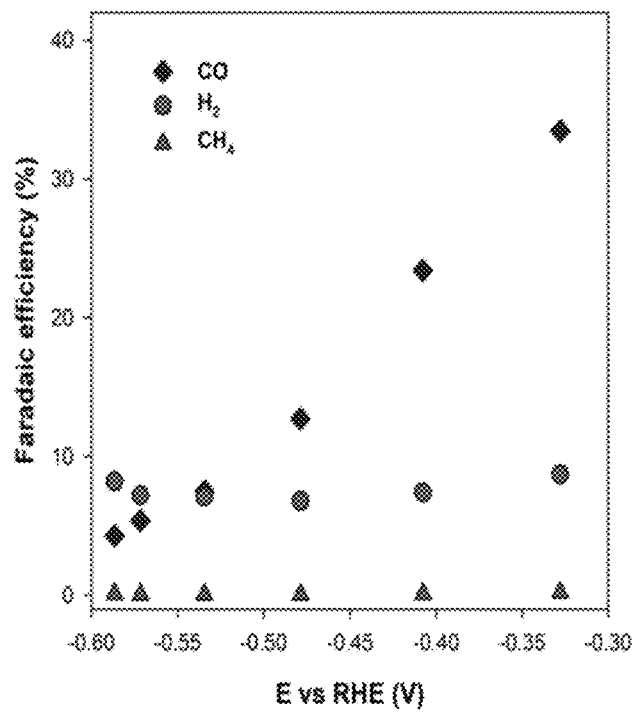
Figure 14D:
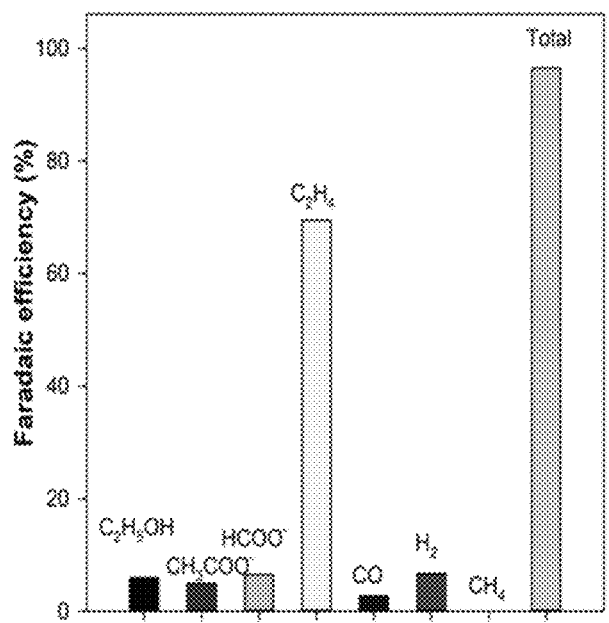
Figure 15A:
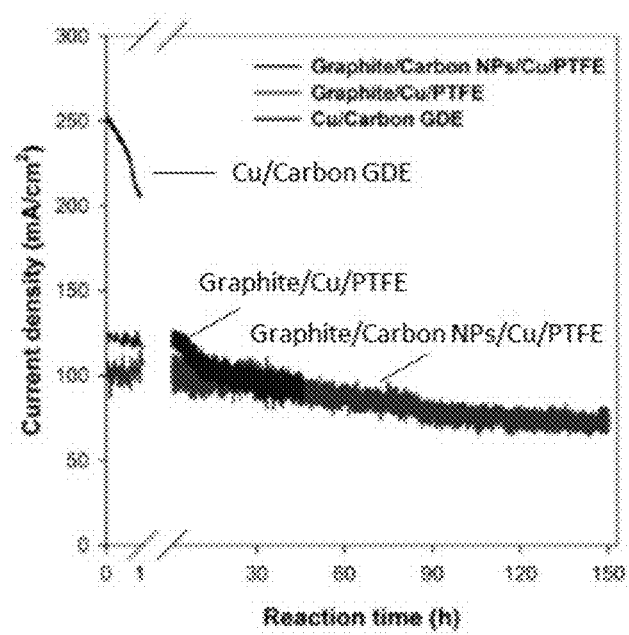
FIGS. 15a-15d are graphs depicting the results of stability tests of polymer-based gas-diffusion electrodes.
Figure 15B:
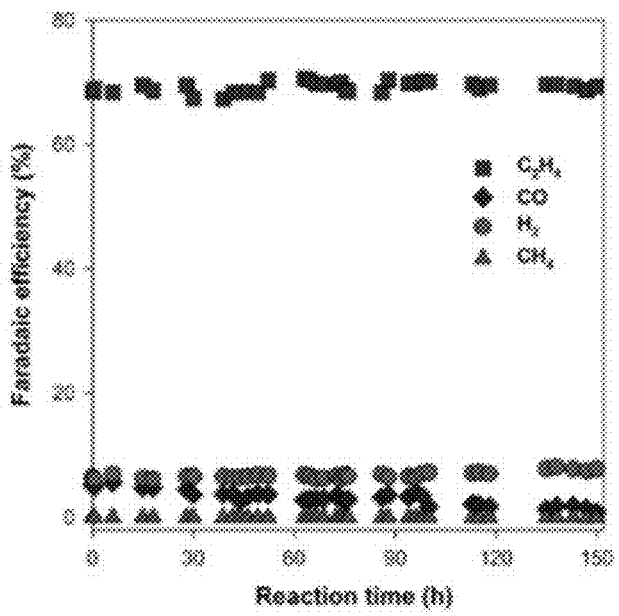
Figure 15C:
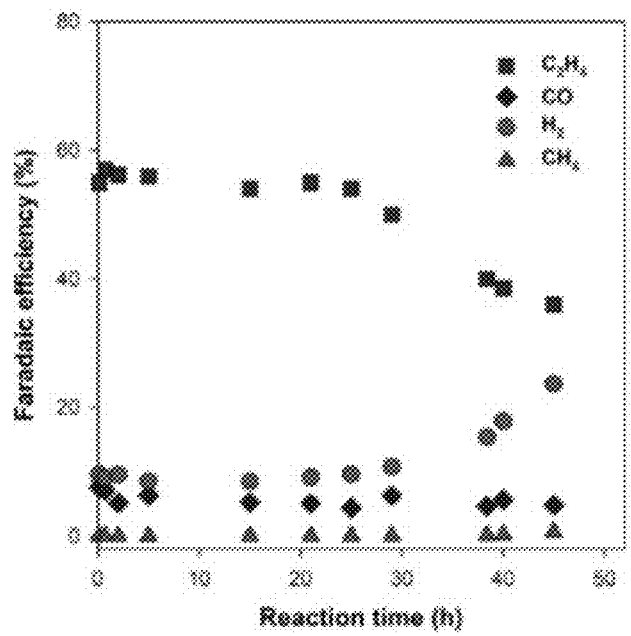
Figure 15D:
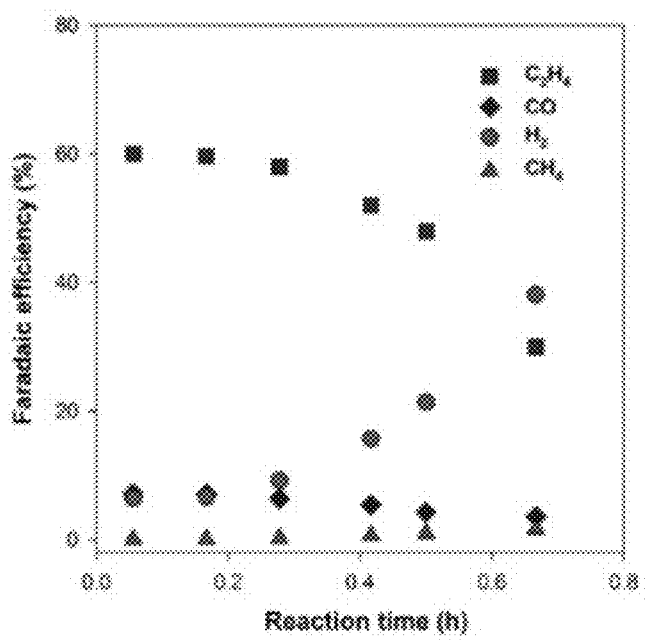
Figure 16A:
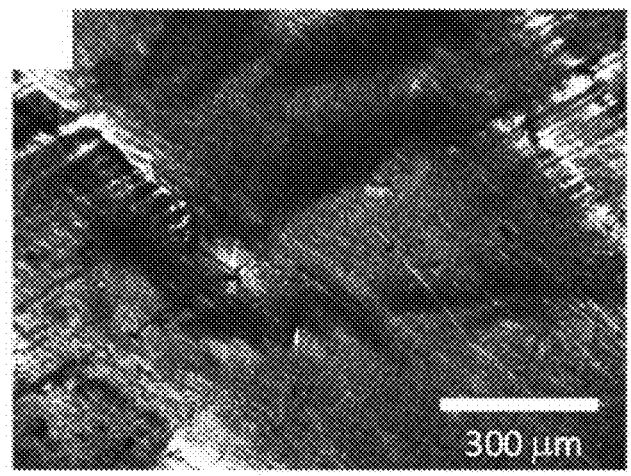
FIGS. 16a-16d are pictures depicting the characterization of Cu/PTFE and Graphite/Cu/PTFE before and after reaction.
Figure 16B:
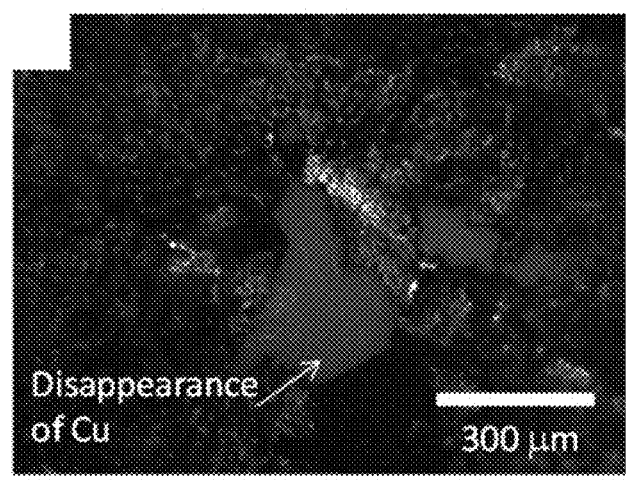
Figure 16C:
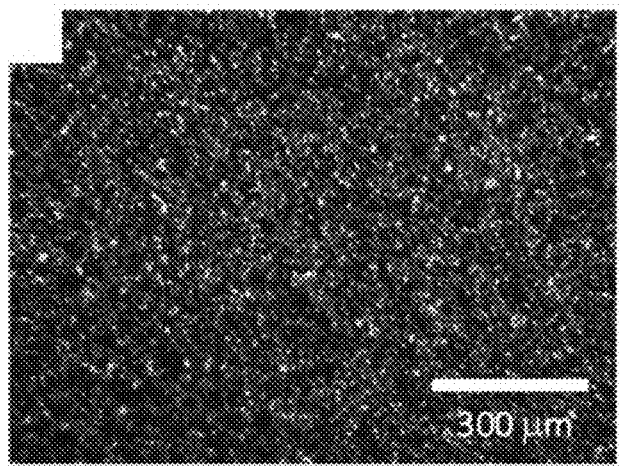
Figure 16D:
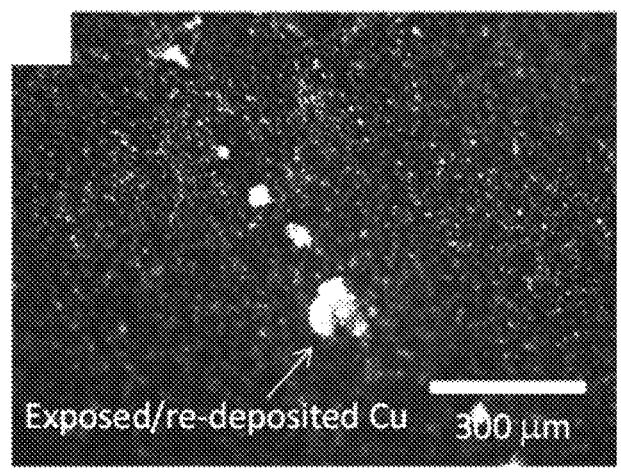
Figure 17A:
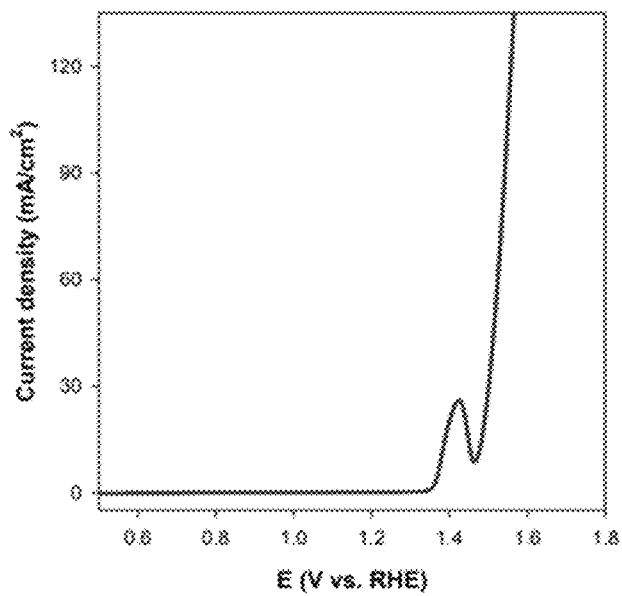
FIG. 17a is a graph depicting oxygen evolution reaction (OER) performance of a NiFeO/Ni foam measured in a 3-electrode setup (with iR correction)
Figure 17B:
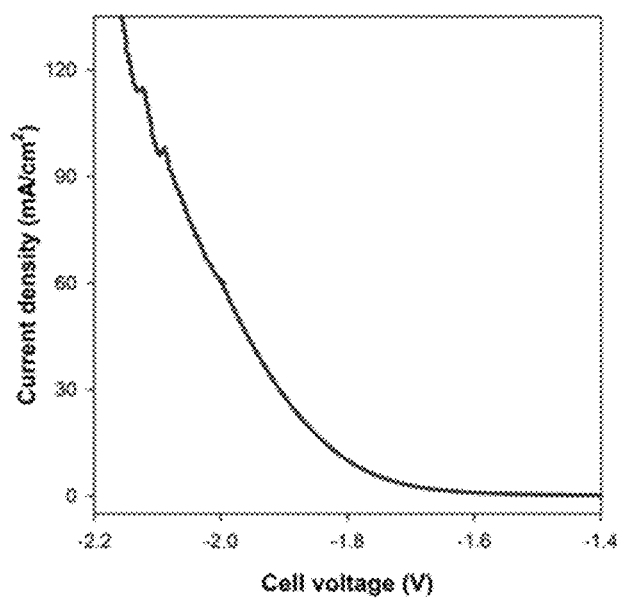
FIG. 17b is a graph depicting full-cell potential performance (with iR correction)
Figure 17C:
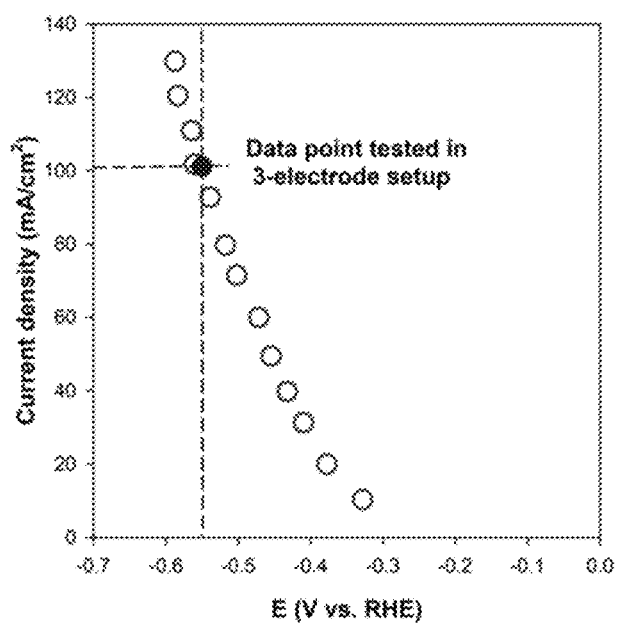
FIGS. 17c and 17d are graphs depicting $CO_2$—RR performance of the cathode potential vs. RHE as calculated from the OER and full-cell performance data.
Figure 17D:
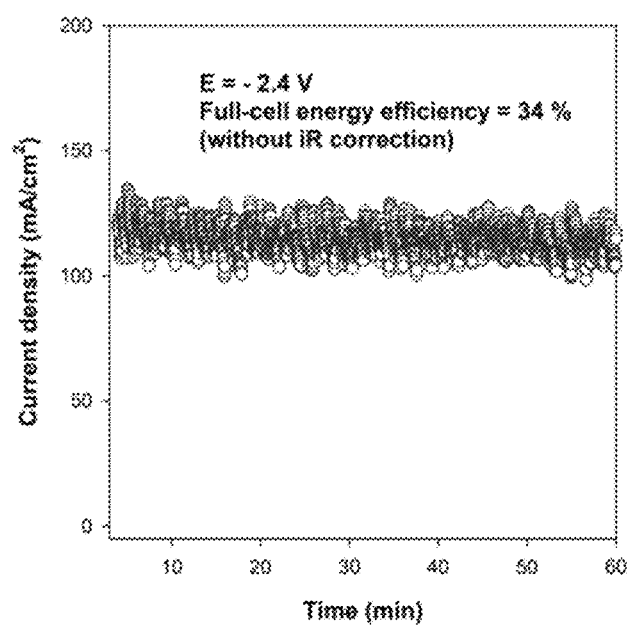

Although the most efficient ethylene production in these tests occurred in 10 M KOH, similar ethylene selectivities were achieved at higher partial current densities by using a thinner catalyst layer and lowering KOH concentrations. Rather than using 10 M KOH to create a hydroxide-mediated abrupt reaction interface (FIG. 1D), a thin catalyst can partially replicate this effect, creating a catalyst-mediated abrupt reaction interface for $CO_2$—RR. Again, using a catalyst thickness of 25 nm, we achieved ethylene selectivities of 66%, 65% and 63% at total current densities of 275, 500 and 750 mA cm⁻² in KOH concentrations of 10 M, 5.5 M and 3.5 M, respectively; in each case KI was added to replace the missing potassium (FIG. 2D). KI was chosen since iodide in the electrolyte is known to increase $CO_2$ reduction activity by accelerating the hydrogenation of the key adsorbed CO intermediate. An ethylene partial current density of 473 mA cm⁻² at only −0.67 V vs. RHE (FIG. 11) was then achieved.

Although high electrochemical performance can be achieved using the traditional carbon gas-diffusion layer architecture, the stability of these catalysts was relatively poor. The tested carbon gas-diffusion electrode degraded (FIG. 4 and FIG. 12) within 1 hour of continuous $CO_2$—RR operation regardless of catalyst thickness (25 and 1000 nm) or electrolyte concentration (1 M and 7 M KOH). The stability of the carbon gas-diffusion electrode itself was studied by carrying out electroreduction using a gas-diffusion layer without a Cu catalyst. The results showed that the oxygen content in the gas-diffusion layer was doubled and the surface of carbon turned from hydrophobic to hydrophilic when a negative potential of −0.4 to −0.8 V vs. RHE was applied. It was concluded that the instability of the Cu on a carbon gas-diffusion electrode arose because the gas-diffusion layer became flooded as its hydrophobicity was lost during operation. Once the gas-diffusion layer floods, the pathways for the diffusion of $CO_2$ in the gas phase toward the catalyst becomes obstructed, and high $CO_2$ reduction currents can no longer be sustained.

Figure 3B:
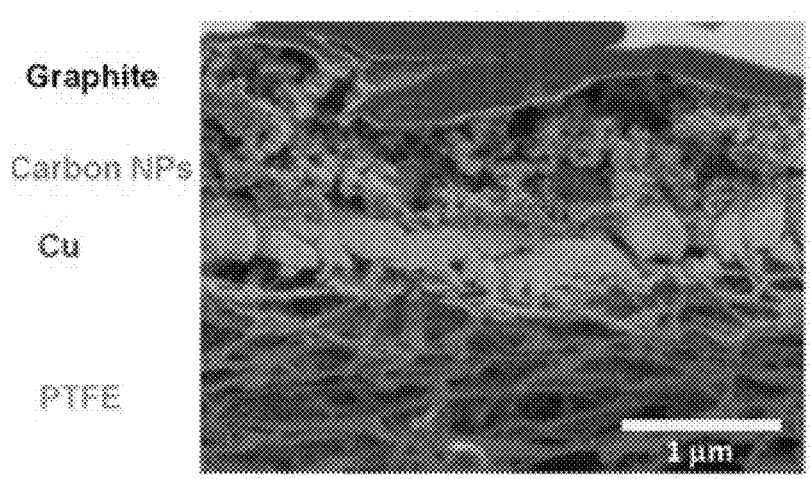
Figure 3C:
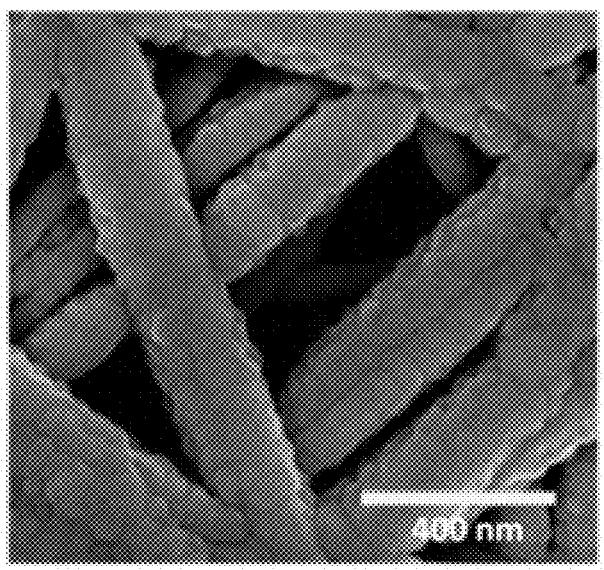

To improve stability, a new electrode configuration that decoupled the hydrophobic and current collection requirements of traditional carbon gas-diffusion layers was developed (FIG. 1A). Instead of relying on a single multi-functional layer, the polytetrafluoroethylene (PTFE) and carbon nanoparticles (NPs) were separated into two layers that sandwich the Cu catalyst while maintaining an abrupt reaction interface (FIG. 3A). In this configuration (Graphite/Carbon-NPs/Cu/PTFE electrode), the pure PTFE layer acted as a more stable hydrophobic gas-diffusion layer that mitigates flooding issues, while the presence of carbon NPs and graphite stabilizes the Cu catalyst surface. To fabricate an example of the new polymer-based gas-diffusion electrode, a Cu catalyst layer was sputtered onto a porous PTFE membrane with a pore size of 220 nm (FIG. 3C). Carbon black nanoparticles were then spray-coated on top to electrically connect the catalyst layer and provide a uniform distribution of current density over the geometric surface (FIG. 13). An added graphite layer acted as an overall support and current collector. The thin Cu layer is seen sandwiched between the two layers in a cross-sectional SEM showing the abrupt $CO_2$ reaction interface is conserved in this configuration (FIG. 3B). XPS characterization (FIG. 13) revealed that the sample consisted mainly of $Cu^0$ and $Cu^{2+}$.

Figure 3D:
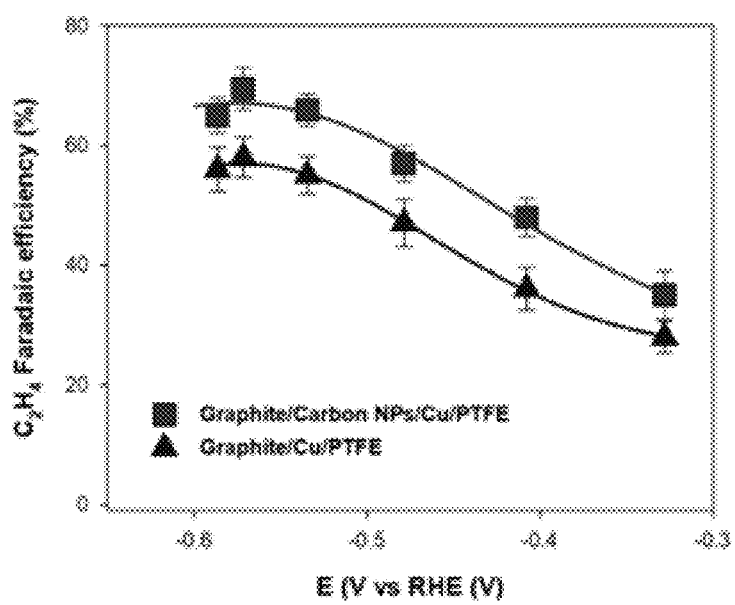
FIG. 3d is a graph depicting the effect of addition of carbon NPS between Cu and graphite.

The example new electrode (also referred to as CME or a multilayer $CO_2$ reduction composite catalyst, herein) showed high $CO_2$—RR selectivity compared to $H_2$ evolution in 7 M KOH, in similar fashion to the carbon gas-diffusion electrode (see Table 1). Although the addition of the carbon NPs between Cu and graphite did not affect the total current density (FIG. 14), the ethylene Faradaic efficiency rose to 70% (FIG. 3D). The additional carbon support may contribute to a more even distribution of current across the Cu electrode while inhibiting the diffusion of $OH^-$ to the bulk electrolyte, further diminishing CO production to 3% (FIG. 14). To evaluate the possibility that carbon NPs could act as a carbon source, $CO_2$—RR using isotopic $^{13}CO_2$ as the feedstock was performed. The data show that all of the produced ethylene is derived from $^{13}CO_2$.

Figure 4:
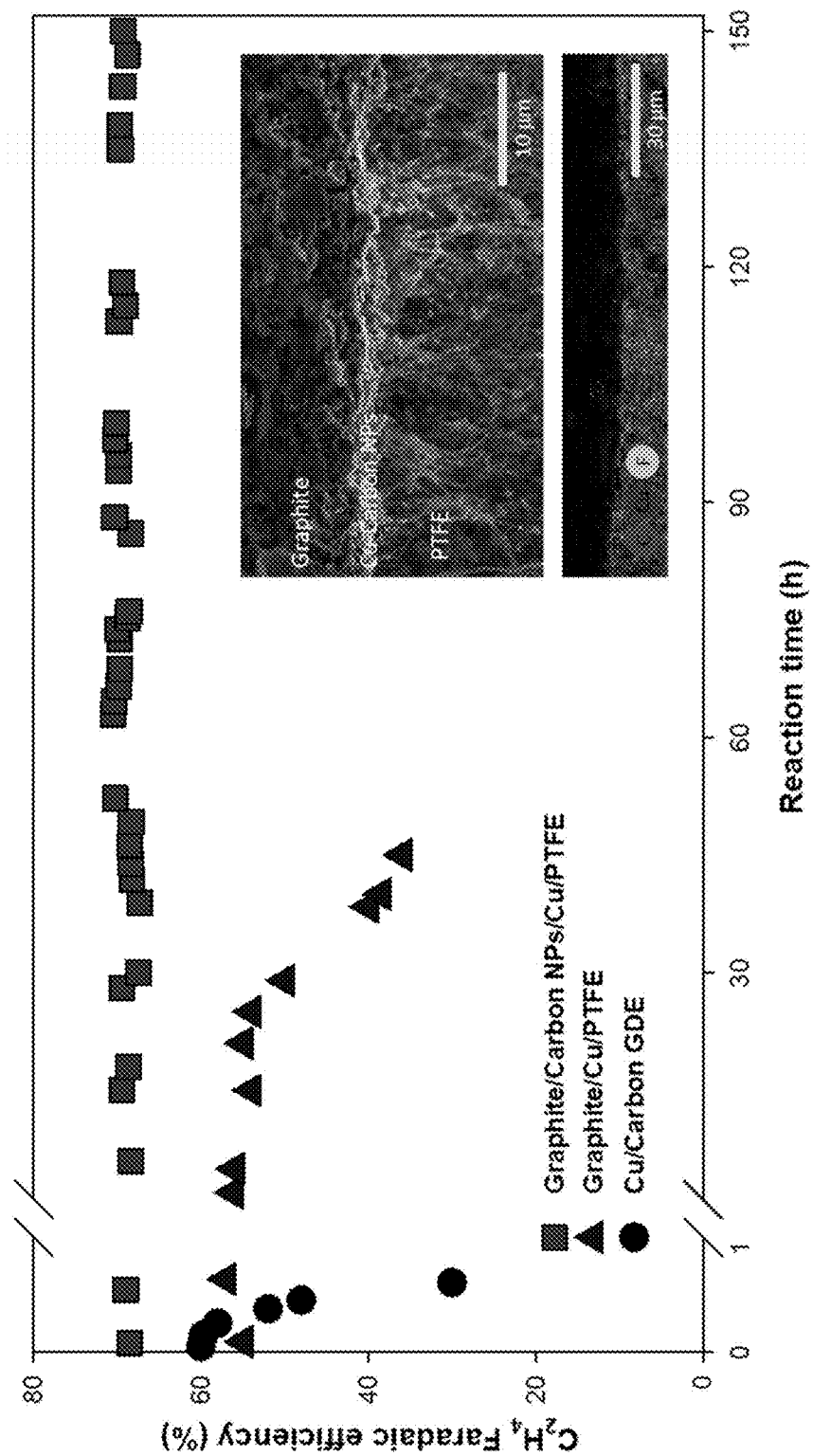
FIG. 4 is a graph depicting a stability test of the polymer-based electrode.
Figure 5A:
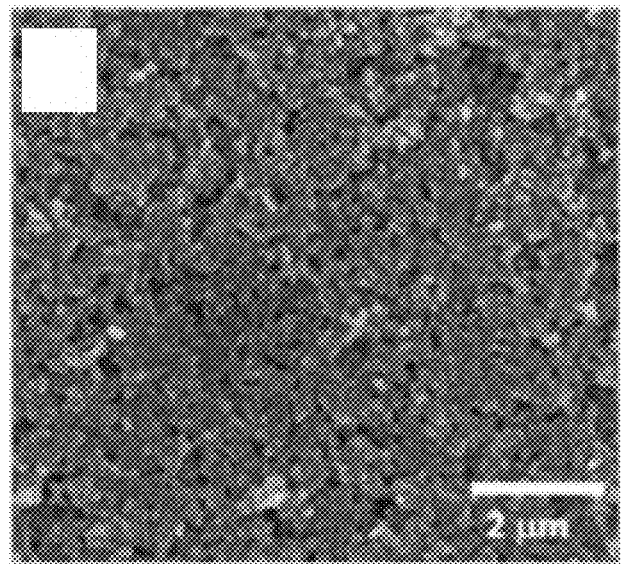
FIGS. 5a-5f are pictures depicting the structural characterization of samples of Cu catalyst deposited onto a carbon gas-diffusion layer before and after $CO_2$ reduction.
Figure 5B:
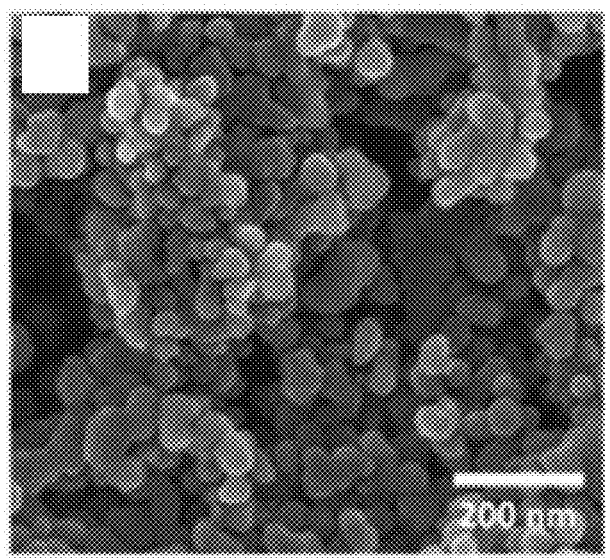
Figure 5C:
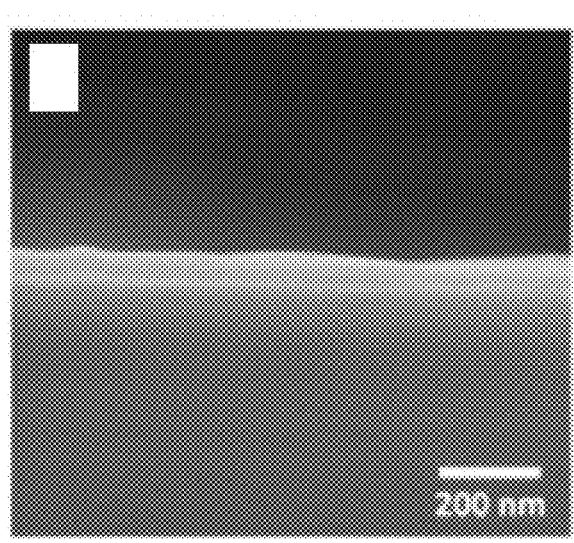
Figure 5D:
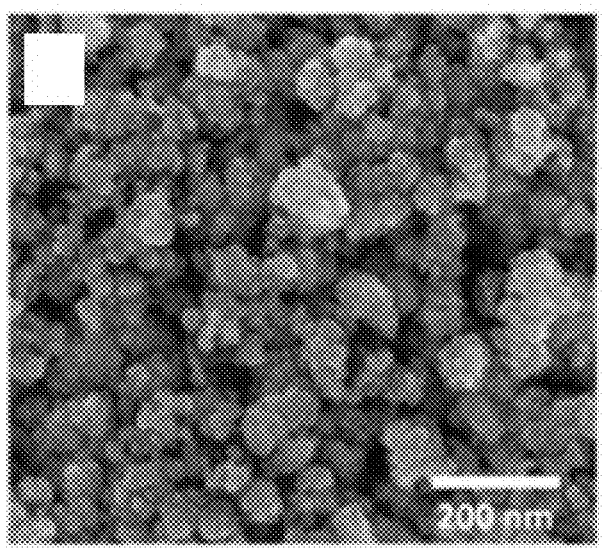
Figure 5E:
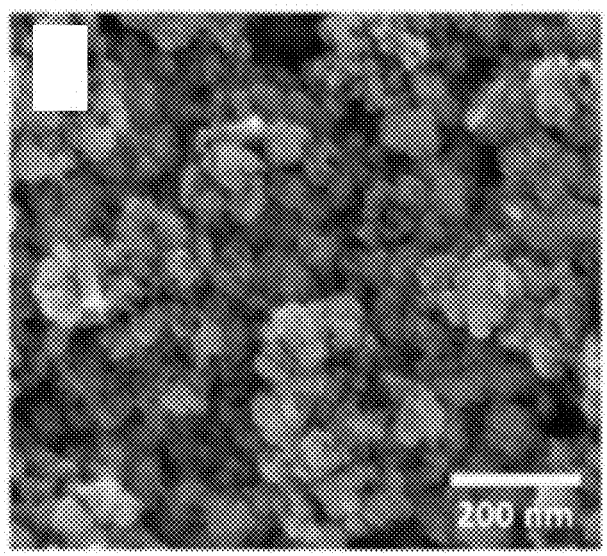
Figure 5F:
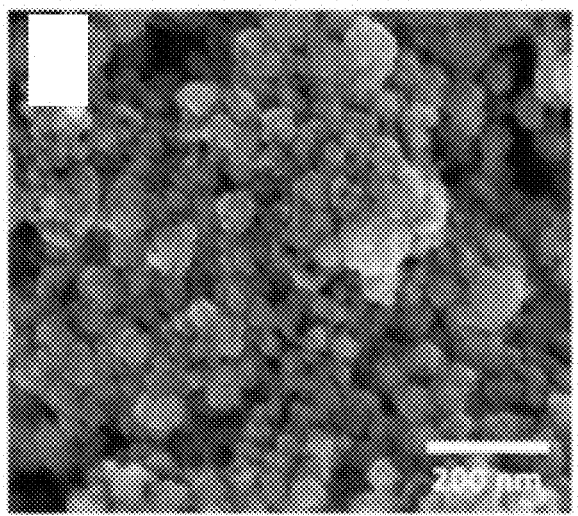

The new example Graphite/Carbon-NPs/Cu/PTFE electrode operated over 150 hours without a loss in ethylene selectivity at current densities between 75 and 100 mA cm$^{-2}$ (FIG. 4 and FIG. 15). This represents a 300-fold increase in operating lifetime compared to the Cu/Carbon gas-diffusion layer. When compared to the same electrode configuration without carbon nanoparticles, the Graphite/Carbon-NPs/Cu/PTFE design also provided longer, higher, and more consistent ethylene selectivities due to the more mechanically and electrically connected catalyst layer (FIGS. 15 and 16). Because $CO_2$ conversion to hydrocarbons is usually operated at very negative potentials (about 1 V vs. RHE), material restructuring—even in milder electrolytes and at lower operating currents—can occur over time, and few catalysts have demonstrated sustained high ethylene selectivities over 1 hour of operation (Table 1). It is herein proposed that the low overpotential required in the new example system may contribute to avoiding excessive surface reconstruction and may be a factor in the observed stable selectivity for ethylene. The observed decrease in current density on the Graphite/Carbon-NPs/Cu/PTFE catalyst over extended operating times is equitable to a 20 mV increase in potential (FIG. 17).

The new example electrode configuration shows promise as an easy-to-construct and highly-stable system with compatibility with a variety of different catalysts and operating conditions, as demonstrated here by the long-term stability in 7 M KOH. Stable testing in highly alkaline conditions is also important practically as a high conductivity electrolyte will likely be desirable to reduce ohmic losses and boost the overall efficiency of an entire cell. Operating in 10 M KOH versus 0.1 M $KHCO_3$, for instance, results in a 47-fold decrease in ohmic overpotentials.

In addition, the Graphite/Carbon-NP/Cu/PTFE cathode was combined with a $NiFeO_x$ oxygen evolution catalyst to perform a full-cell operation in 7 M KOH electrolyte (FIG. 17). The system delivers a full-cell energy efficiency of 34% (without the benefit of iR correction) at an applied voltage of 2.4 V and an average current density of 110 mA cm$^{-2}$ over 1 hour of operation.

The concept of forming an abrupt reaction interface in a catalyst employed in highly alkaline media facilitated the devices and methods herein to achieve advances in the combination of ethylene electroproduction current density, selectivity, and operating lifetime. The resultant electrical-to-chemical power conversion efficiency, when coupled with the operating stability, indicates a promising platform for $CO_2$ reduction applications. In this work, operational stability was enhanced via the introduction of a polymer-based gas-diffusion layer that sandwiches the reaction interface between separate hydrophobic and conductive supports, providing a constant ethylene selectivity for an initial 150 operating hours.

The following descriptive section provides supplementary information and results regarding this technology.

$CO_2$ and CO Reduction on Carbon Gas-Diffusion Layers

Electroreduction for the results shown in FIGS. 1-4 were performed in a flow-cell configuration consisting of a gas-diffusion layer, anion exchange membrane (Fumasep FAB-PK-130) and nickel foam (1.6 mm thickness, MTI Corporation) anode. The experiments in FIGS. 1 and 2 were deposited on top of the microporous side of a Freudenberg gas-diffusion layer. The combined catalyst and diffusion layer, anion exchange membrane and nickel anode were then positioned and clamped together using polytetrafluoroethylene (PTFE) spacers such that a liquid electrolyte could be introduced into the chambers between the anode and membrane as well as the membrane and the cathode. Gaseous $CO_2$ could then be passed behind the gas-diffusion layer and diffuse into the liquid electrolyte present at the catalyst. In the catholyte stream a port drilled into the PTFE spacer is present for a Ag/AgCl reference electrode to be positioned a specific distance from the working electrode.

The $CO_2$ and CO reduction experiments were performed using an electrochemical workstation (Autolab PGSTAT302N) with a Ag/AgCl reference (with 3 M KCl as the filling solution). iR compensation losses between the working and reference electrodes were measured using electrochemical impedance spectroscopy (EIS). Electrode potentials after iR compensation were rescaled to the reversible hydrogen electrode (RHE) reference by:

$$E_{RHE}=E_{Ag/AgCl}+0.197 \text{ V}+0.591\times\text{pH} \quad (1)$$

The pH in Eq. (1) is determined using a reaction-diffusion model as described in the characterization section for 1, 5 and 10 M KOH. For all reported data the pH value used in Eq. (1) is taken at a current of 0 mA/cm$^2$ as this represents the worst-case scenarios for our reported potentials. For completeness, the predicted electrode pH as a function of current density up to 25 mA/cm$^2$ is shown in FIG. 7. The geometric area is used for reporting all the experimental data in the report, employing the same convention for reporting FE's and current densities as previous works. All potentials reported here were obtained by averaging over a timespan of at least 150 s for each applied current.

The electrolytes (KOH solution of various concentrations, 100 mL) were circulated through the electrochemical cell using peristaltic pumps with a silicone Shore A50 tubing. The electrolyte flow was keep at 10 mL min$^{-1}$. The $CO_2$ (Linde, 99.99%) flow was kept constant at 50 mL min$^{-1}$ using a mass flow controller. The reactions were run for at least 150 s before the gas products were collected for analysis. KOH concentrations of 15 M could not reliable be evaluated as salt precipitated on the gas-diffusion electrode, preventing accurate measurement of onset potentials.

The gas products from $CO_2$ reduction (CO, $H_2$, $CH_4$ and $C_2H_4$) and CO reduction ($H_2$, $CH_4$ and $C_2H_4$) were analyzed using a gas chromatograph (PerkinElmer Clarus 680) coupled with a thermal conductivity detector (TCD) and a flame ionization detector (FID). The gas chromatograph was equipped with a Molecular Sieve 5A and Carboxen-1000 column packed columns. Argon (Linde, 99.999%) was used as the carrier gas. All Faradaic efficiencies reported were averaged from at least three different runs.

The onset potentials for CO and $C_2H_4$ are the lowest potentials at which the Faradaic efficiency for CO and $C_2H_4$ are respectively higher than 1±0.3%. To measure the onset potential, the flow rate of $CO_2$ and CO feedstock was reduced to 2-5 mL min$^{-1}$ so that the GC detector signals of the products are at least 5 times higher than the noise signal. $^{13}$C-labelling experiments were performed in the similar conditions as those of $^{12}CO_2$. The ethylene product was analyzed using a mass spectrometer (PerkinElmer Clarus SQ 8C) coupled with a HP PLOT-Q capillary column (Agilent). The liquid products were quantified using Nuclear magnetic resonance spectroscopy (NMR). $^1$H NMR spectra of freshly acquired samples were collected on Agilent DD2 500 spectrometer in 10% $D_2O$ using water suppression mode, with Dimethyl sulfoxide (DMSO) as an internal standard. Sixteen second relaxation time between the pulses was used to allow for complete proton relaxation.

The $CO_2$ reduction experiments using Cu catalysts (10 nm, 25 nm, 1000 nm, and 1000 μg) were also performed in an H-cell configuration as controls. Running in 1 M KOH produced only $H_2$ as the concentration of $CO_2$ is less than $10^{-10}$ M. The electrolytes for both the cathode and anode in were then run in 0.1 $KHCO_3$ to compare with prior conditions where peak ethylene selectivities were achieved. $CO_2$ gas was bubbled through the catholyte for at least 30 min to saturate the electrolyte with $CO_2$. The $CO_2$ flow was controlled at 30 mL min$^{-1}$. The reactions were performed under potentiostatic mode with all samples showing peak ethylene selectivities between −0.95 V to −1.2 V vs. RHE (after iR correction). The gas and liquid products were analyzed after 1 hour of reaction using gas chromatography and NMR as described above. All samples showed substantially reduced ethylene FE's in the range of 30-35%, confirming that the high C2 selectivity and efficiency originates from the combination of reaction interface design and the strong alkaline electrolyte; rather than the nature of the catalyst itself.

$CO_2$ Reduction on Polymer-Based Gas-Diffusion Layers:

Electrochemical experiments performed on the polymer-based gas-diffusion layer illustrated in FIGS. 3 and 4 were performed using the same potentiostatic equipment, system orientation, flow conditions and product analysis procedures as the carbon gas-diffusion flow-cell experiments described above.

For the long-term stability tests the operating potential was fixed at −1.8V vs. Ag/AgCl. The electrolyte used was 7 M KOH and was changed every 12 hours during the test to maintain similar ion concentrations and conductivity in the catholyte and anolyte flow channels. The pH of the catholyte slightly changed (<0.03) after 12 hours of the reaction.

Full-cell experiments in FIG. 16 were performed in a two-electrode setup using the Graphite/Carbon NPs/Cu/PTFE electrode as the cathode, a NiFeO$_x$ electrode as the anode (1) and a thin flow-cell design to minimize ohmic losses. The oxygen evolution reaction was also performed on the NiFeO$_x$ anode in a three-electrode setup to measure the potential on an RHE scale. Both the anode and full-cell potentials are shown in FIG. 16a and FIG. 16b with iR corrections applied. The working potential of the cathode vs. RHE was extracted from these full-cell and anode potentials (FIG. 16c). A plot of the current density over time for a fixed cell-potential of 2.4 V (without iR correction) is plotted in FIG. 16d.

Hydrogen Evolution Tests on Cr Electrodes:

A chromium (Cr) catalyst was evaporated onto a carbon gas-diffusion layer with the same morphology as the previous Cu catalysts. Linear sweep curves were performed using both an Ar and $CO_2$ environment on the gas-side of the gas-diffusion layer for electrolyte concentrations of 1, 5 and 10 M KOH (FIG. 6). As only hydrogen was detected as a product in both cases, the voltage differences between the curves in Ar and $CO_2$ environments represents the changes in the electrode pH due to $CO_2$ dissolved in the electrolyte. These pH shifts shown in at 10 mA/cm$^2$ are within 30 mV of the values predicted by the reaction-diffusion model.

DFT Calculations:

Vienna ab initio Simulation Package (VASP) was used to perform all the plane wave density functional theory (DFT) computations. The projected augmented wave (PAW) approach together with the generalized gradient approximation (GGA) parametrized by Perdew, Burke and Ernzerhof (PBE) are employed. Three different crystalline facets, (111), (100) and (110) of the pristine copper are approximated by a 4×4×4 slab in a 20 Å vacuum. Due to the vacuum, dipole corrections are implemented. To resemble the real bulk material and the surface, respectively, two bottom layers are fixed in their positions while the two top layers are free to move due to interaction with the adsorbates. A cut-off energy of 400 eV for the plane wave basis sets and a 4×4×1 Γ-centered Monkhorst-Pack mesh for the k-points sampling in the first Brillouin zone, with a first order Methfessel-Paxton smearing parameter a of 0.1 eV ensured that the energy convergence criteria is better than 1 meV. The k-points grid is doubled for charge density calculations. The self-consistent field (SCF) convergence criterion is set to 1×10$^{-4}$ eV for electronic iteration and the ionic relaxation continued until the maximum force was less than 0.02 eV/Å. This was updated by the conjugate gradient approach.

Almost all previous literature indicates that the CO—CO coupling is pH independent because no proton participates in the coupling reaction. However, the effect of OH on changing the electronic structure and, in turn, the coupling reaction energy was explicitly investigated. In this work, OH was explicitly considered in the simulations to assess how CO bonding and CO—CO coupling energies are affected. For Cu(100) and Cu(111), in two cases, with OH ion and without OH ion, we calculated the zero point energy (ZPE), heat capacity, and entropy of the adsorbate and molecular gases based on the vibrational frequencies within quasi-harmonic approximation framework. These values were added to the DFT ground state energy to obtain the room temperature Gibbs free energies. Moreover, this work considered the transition state to calculate the activation energy barriers of the CO—CO coupling for these facets using the nudged elastic band (NEB) method.

In addition, to include the solvent effects, the invention considered three explicit water molecules with and without OH ion. Previous studies showed that three water molecules are enough to stabilize OH ion, and this invention considered similar configurations in the present analysis. This work considered OH ion in two forms: adsorbed on the surface and solvated within the explicit water molecules. The same calculations for vibrational frequencies and transition states have been done to convert all energies to the Gibbs free energy at room temperature and to calculate the activation energy barriers for CO—CO coupling.

For the calculation without explicit water molecules, one and two adsorbed carbon monoxides are simulated on all three surfaces with a varying number and proximity of hydroxides. In each case, different rational possible configurations (overall more than 200 configurations) are considered to find the global minima. The CO adsorption energy is calculated as:

$$E_{adsorption} = E_{*CO}^{n-OH} - (E_{*}^{n-OH} + E_{CO}) \quad (2)$$

In equation (2), $E_{*CO}^{n-OH}$ is the electronic structure energy of the adsorbed CO on the catalyst with n-OH ions on the surface, $E_{*}^{n-OH}$ is the energy of the slab without the CO adsorbate but includes n-OH ions, and $E_{CO}$ is the CO energy in gas phase without the catalyst. The CO—CO coupling energy barrier is calculated according to the following reaction and the corresponding reaction free energy:

$$*OCCO = *CO + *CO \quad (3)$$

$$E_{C-C\ coupling\ barrier}^{n-OH} = E_{*OCCO}^{n-OH} - (E_{*CO}^{n-OH} + E_{*CO}^{n-OH}) \quad (4)$$

In equation (4), the zero-point energy (ZPE), heat capacity, and entropy are considered to convert all energies to the Gibbs free energy. In addition, the transition state is considered via NEB method to calculate the activation energy barrier.

In our simulations without explicit water molecules, 0, 1 and 2 OH are considered on a surface of 16 (4×4) copper atoms, corresponding to 0, 1/16 and 2/16 ML concentrations, respectively. However, in configurations where OH is very close to the adsorbed CO, it is assumed that the OH concentration is even higher and forced to be very close to the adsorbates, and the local minima is calculated in this case. These cases are virtually described by 3/16 and 4/16 ML in FIG. 8. Otherwise, in 0, 1/16 and 2/16 ML concentrations, the configuration with the global minima energy is the reference for our calculations. This includes all possible configurations for OH ions adsorbed on the surface or being present in the vacuum just above the surface.

From FIG. 8 related to the calculations without explicit water and without considering the transition state, one ca see that CO—CO coupling energy barrier decreases with increasing OH concentration. It is found that increasing the OH concentration on the slab surface implicitly changes the charge density of the C atoms in adsorbed CO and OCCO, such that CO bonding becomes weaker and CO—CO coupling becomes stronger and more favorable. On the (100) surface, for instance, CO without any OH is adsorbed on the hollow site with four bonds to the surrounding copper ions. However, increasing the OH concentration pushes CO to the bridge site with two folds bonding and weaker binding energy. This bonding becomes even weaker as OH is further added to the surface, such that OH in the vicinity pushes CO to the top site with one-fold bonding. The same trend is observed on two other facets. FIG. 8 demonstrates this situation on (100).

In few of the simulations, the transition state energy is less than the final state energy, indicating a simple uphill energy barrier. In these cases, therefore, the final energy is considered as the main energy barrier.

Including three explicit water molecules, this work studied the CO—CO coupling energy barrier with and without OH on both Cu(100) and Cu(111). OH is considered in two forms: adsorbed and solvated. Surprisingly, when OH is solvated in the explicit water molecules, the activation energy barrier for CO—CO coupling is higher than when OH is adsorbed on the surface still with presence of the explicit water molecules. In general, this invention considered the lowest energy barrier between these two situations as the activation energy barrier for CO—CO coupling with OH. The calculated activation energy barriers for these two facets are mentioned in Table 1

In general, this invention concluded that at higher OH concentrations CO bonding is weaker and this could lead to more CO in gaseous products and easier CO—CO coupling. Indeed, both are shown under experimental conditions. This invention calculated the electronic charge density on each ion by Bader charge analysis (11). As demonstrated in FIG. 8, one sees that increasing the OH concentration, not only decreases the CO—CO coupling energy barrier but also increases the charge difference between two C atoms in coupled carbon monoxides. This increased charge difference, makes a stronger intramolecular dipole and consequently more stable coupling due to the stronger ionic adsorption. The electronic charge distribution and also charge difference between two C atoms in coupled carbon monoxides, i.e. proportional to the dipole magnitude.

Material Synthesis:

The carbon-based Freudenberg (Fuel cell Store) gas-diffusion layer (GDL) was used as substrate for the experiments in FIGS. 1 and 2. Cu (99.99%) was evaporated on the substrate using an Angstrom Nexdep Evaporator. The deposition was performed in ~$10^{-5}$-$10^{-6}$ Torr at 1.5 Å/sec. The thicknesses of the samples was confirmed via scanning electron microscopy (SEM). The 1000 μg sample was prepared by drop-casting commercial Cu nanoparticles (NPs) (Sigma-Aldrich, particle size <50 nm). The NPs were first dispersed in a mixture of isopropanol, water and Nafion solution (50 microliter of Nafion solution in 1 mL of 3:1 isopropanol: water mixture). The mixture was then sonicated for 1 hour to produce Cu nanoparticle inks. The Cu was painted on the carbon gas-diffusion layer and dried overnight at room temperature. The catalyst with a thickness of 100 nm obtained was used in examples 1A to 1C. The catalysts with the thickness of 10 nm, 25 nm and 1000 nm obtained were used in examples 2A to 2D and was also used to obtain the results in table 1. The data from this electrode design are shown in FIGS. 1 and 2.

The polymer-based gas-diffusion layer used an Aspire ePTFE membrane as a gas-diffusion layer and catalyst substrate with a pore size 200 nm. Cu was sputtered onto the PTFE membrane using a pure Cu target (99.99%) at a sputtering yield of 5 nm min$^{-1}$. Carbon black NPs (Sigma-Aldrich, <100 nm) were dispersed in a mixture of isopropanol, water and Nafion solution (50 microliter of Nafion solution in 1 mL of 3:1 isopropanol: water mixture). The mixture was then sonicated for 1 hour to produce an ink, which was spray coated onto the Cu surface of the Cu/PTFE electrode. Graphite was drop-casted on top of the carbon NP's using a similar ink solution. The catalyst obtained was used in example 3A to D and example 4. The data from this electrode design are shown in FIGS. 3 and 4 and table 3.

Characterization:

The morphologies of the prepared electrodes were investigated using SEM on a Hitachi SU-8230 apparatus and Transmission Electron Microscopy (TEM) on a Hitachi HF-3300 instrument with an acceleration voltage of 200 kV.

Cross-sectional elemental mapping was performed using a Hitachi CFE-TEM HF3300, the Cu coated GDL sample was prepared using Hitachi Dual-beam FIB-SEM NB5000. Briefly, a slice (~50-100 nm thick) of Cu coated GDL was cut using Ga-beam and attached with a TEM stage with tungsten deposition and lifted out for subsequent STEM-EDX analysis.

The structural characteristics of the Cu electrodes were measured by powder X-ray diffraction at room temperature on a MiniFlex600 instrument with a copper target ($\lambda$=1.54056 Å). The oxidation state and compositions of the samples were studied by X-ray photoelectron spectroscopy (XPS) (model 5600, Perkin-Elmer). The binding energy data were calibrated with reference to the C 1s signal at 284.5 eV. The Cu loading on the gas-diffusion layer was characterized using an inductively coupled plasma optical emission spectrometer (ICP-OES, Agilent Dual-View 720 with a charge-coupled device (CCD) detector for full wavelength coverage between 167 nm and 785 nm).

The in-situ X-ray absorption spectroscopy (XAS) studies were performed at the Soft X-Ray Microcharacterization (SXRMB) Beamline at the Canadian Light Source. The Cu K-edge XAS fluorescence spectra were collected using a 4-element Si(Li) drift detector under ambient atmosphere with a custom in-situ liquid cell fabricated from Teflon. $CO_2$ gas was continuously bubbled into the electrolyte to ensure saturation. The pre-edge region was scanned from 8879 eV to 8974 eV at a rate of 5 eV/s, the near-edge region was scanned from 8974 eV to 9019 eV at a rate of 0.45 eV/s and the post-edge region was canned from 9019 eV to 12 k with a rate of 0.05 k/s. The XAS data were analyzed using the software package Athena.

The electrochemically active surface areas of the catalysts were measured using a double layer capacitance method in 0.1 M $HClO_4$ electrolyte. Cyclic voltammetry scans were recorded in the potential range from −0.05 to 0.2 V vs. RHE. The roughness factors of the catalysts were compared to electrochemically polished Cu foil whose surface area is defined as 1.

Modeling of CO2 Diffusion into the Liquid Electrolyte:

As described in the section above regarding $CO_2$ and CO reduction on carbon gas-diffusion layers, a reaction-diffusion model is used to predict the pH in the vicinity of the catalyst layer which can then be used to adjust the measured potentials in Eq. (1). At 0 mA/cm² this surface pH differs from the bulk KOH concentration due to $CO_2$ that diffuses across the gas-liquid interface and interacts with hydroxide, lowering the local pH within the catalyst layer from that of the bulk KOH electrolyte. Additionally, as current is applied to the catalyst layer, hydroxide will be generated causing the local pH to increase from this minimum case and eventually surpass the bulk pH of the electrolyte. The reaction-diffusion model takes into account interactions between the following species in the electrolyte ($CO_2$, $OH^-$, $HCO_3^-$ and $CO_3^{2-}$) as well as the consumption of $CO_2$ and the production of $OH^-$ in the catalyst layer. The following equations governing these interactions are adopted from previous works (13, 14):

$$\frac{\partial [CO_2]}{\partial t} = D_{CO_2} \frac{\partial^2 [CO_2]}{\partial x^2} - [CO_2][OH^-]k_{1f} + [HCO_3^-]k_{1r} - R_{CO_2} \quad (5)$$

$$\frac{\partial [HCO_3^-]}{\partial t} = D_{HCO_3} \frac{\partial^2 [HCO_3^-]}{\partial x^2} + [CO_2][OH^-] \quad (6)$$

$$k_{1f} - [HCO_3^-]k_{1r} - [HCO_3^-][OH^-]k_{2f} + [CO_3^{2-}]k_{2r}$$

$$\frac{\partial [CO_3^{2-}]}{\partial t} = D_{CO_3^{2-}} \frac{\partial^2 [CO_3^{2-}]}{\partial x^2} + [HCO_3^-][OH^-]k_{2f} - [CO_3^{2-}]k_{2r} \quad (7)$$

$$\frac{\partial [OH^-]}{\partial t} = D_{OH} \frac{\partial^2 [OH^-]}{\partial x^2} - [CO_2][OH^-] \quad (8)$$

$$k_{1f} + [HCO_3^-]k_{1r} - [HCO_3^-][OH^-]k_{2f} + [CO_3^{2-}]k_{2r} + R_{OH}$$

In the above equations, $R_{CO2}$ and $R_{OH}$ account for the consumption of $CO_2$ in the reduction reaction and the production of OH—, respectively. As these reactions only occur within the catalyst layer the following equations are spatially dependent and are assumed to occur homogeneously throughout the entire catalyst layer:

$$R_{CO2} = \begin{cases} \frac{j}{F}\left(\frac{FE_{CO}}{n_{e,co}} + \frac{FE_{C2H4}}{n_{e,C2H4}} + \frac{FE_{EtOH}}{n_{e,EtOH}}\right)\frac{\varepsilon}{L_{catalyst}}, & 0 \le x \le L_{catalyst} \\ 0, & x > L_{catalyst} \end{cases} \quad (9)$$

$$R_{OH} = \begin{cases} \frac{j}{F}\frac{\varepsilon}{L_{catalyst}}, & 0 \le x \le L_{catalyst} \\ 0, & x > L_{catalyst} \end{cases} \quad (10)$$

In calculating Eqs. (9) and (10) the geometric current density, j, and product selectivities, $FE_{CO}$, $FE_{C2H4}$, $FE_{EtOH}$ and $FE_{H2}$, are imposed. A porosity of 60%, $\varepsilon$, and selectivity distribution of 10% $H_2$, 10% CO and 80% (EtOH+$C_2H_4$) is assumed. Panels (f), (g) and (h) in FIG. 7 assume a catalyst thickness, $L_{catalyst}$, of 100 nm, which matches the experimental catalyst used in FIG. 1.

Figure 6A:
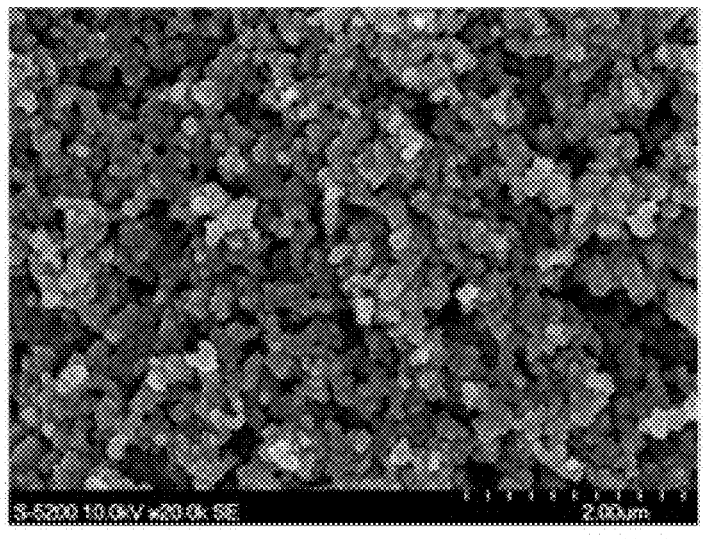
FIGS. 6a and 6b are pictures depicting the structural characterization of samples of hydrogen-evolving (Cr) catalyst deposited onto a carbon gas-diffusion layer.
Figure 6B:
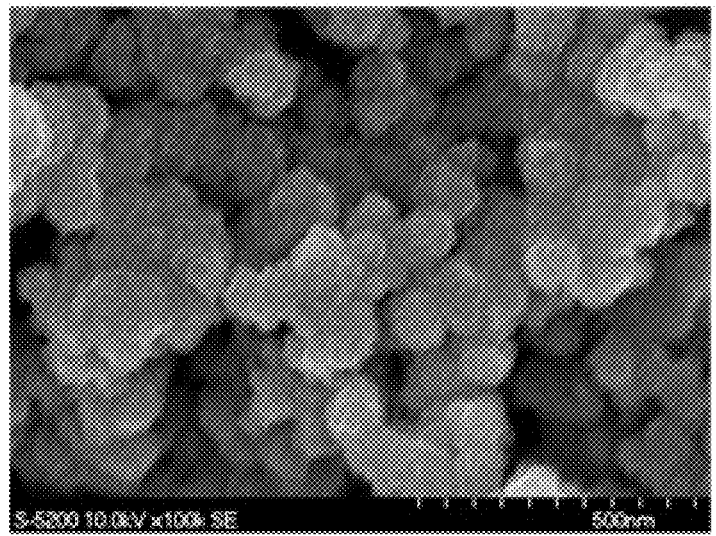
Figure 6C:
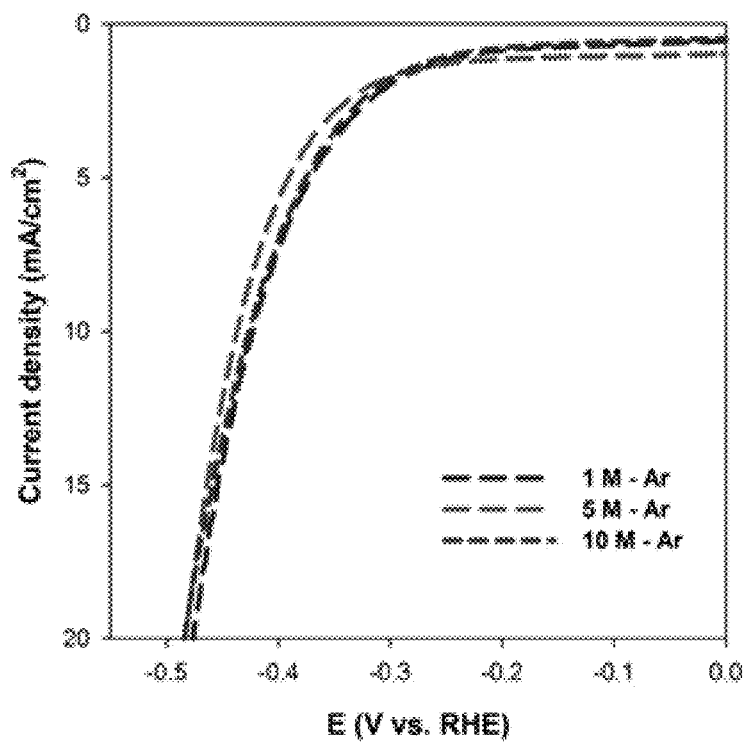
FIGS. 6c-6f are graphs depicting the effects of hydroxide on $CO_2$ reduction.
Figure 6D:
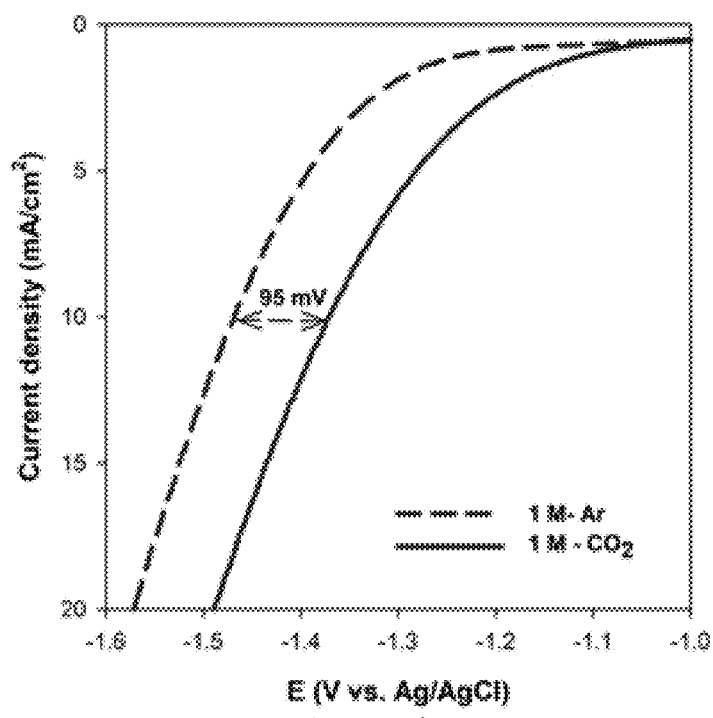
Figure 6E:
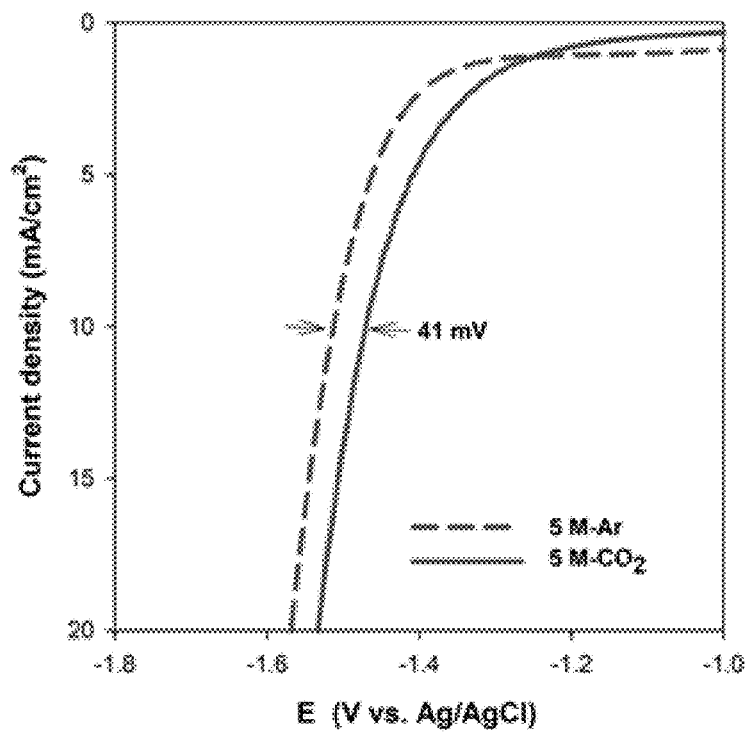
Figure 6F:
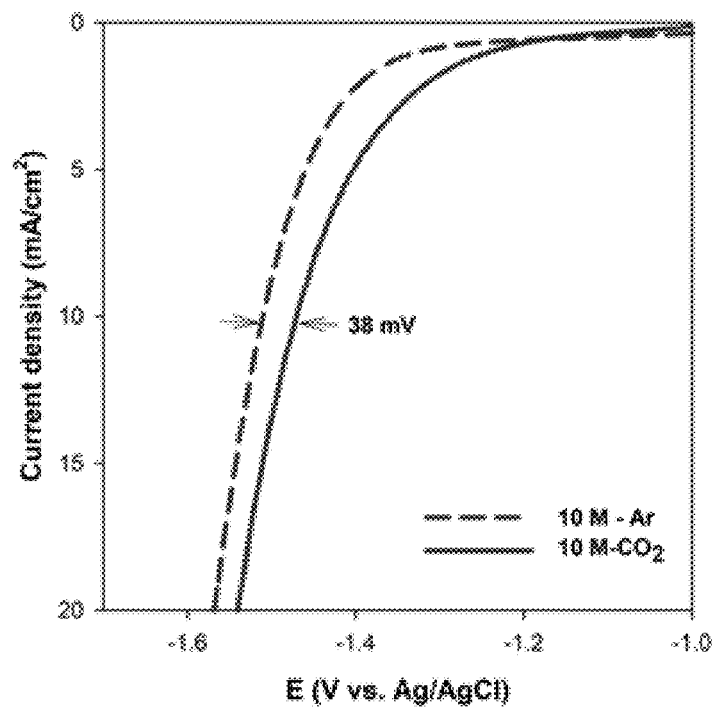
Figure 7A:
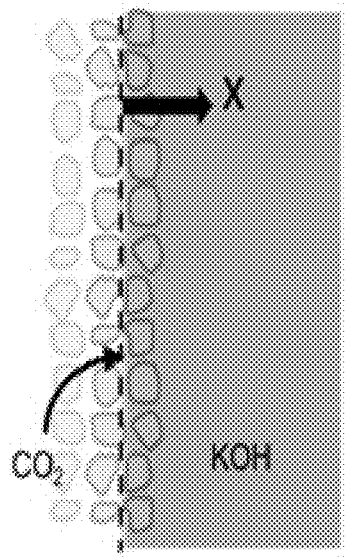
FIGS. 7a-7h depicts modelling of the gas-liquid diffusion interface with and without a catalyst layer or applied current.
Figure 7B:
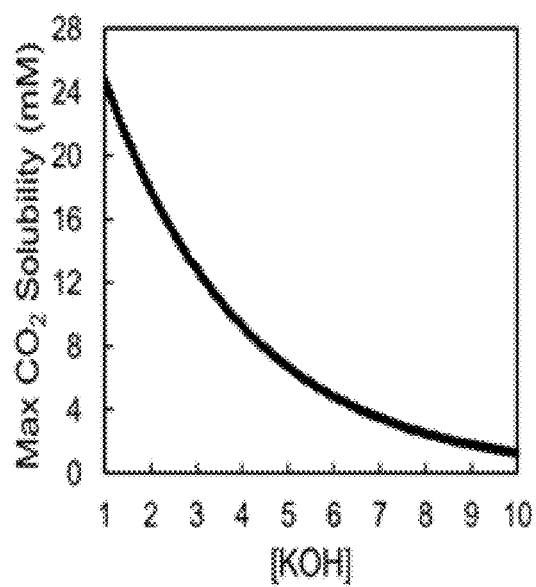
Figure 7C:
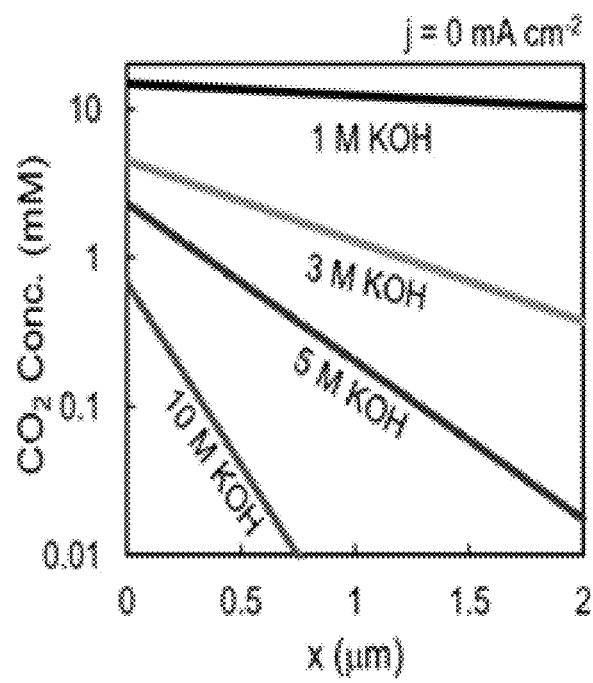
Figure 7D:
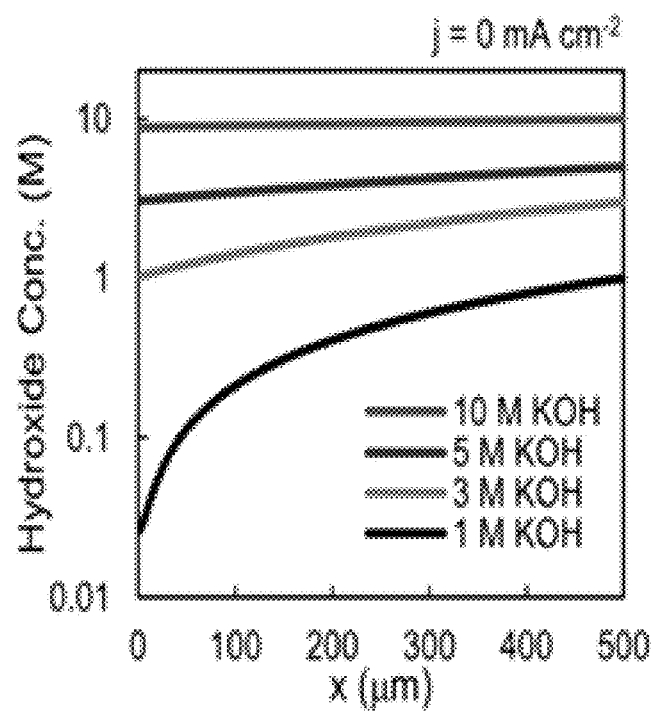
Figure 7E:
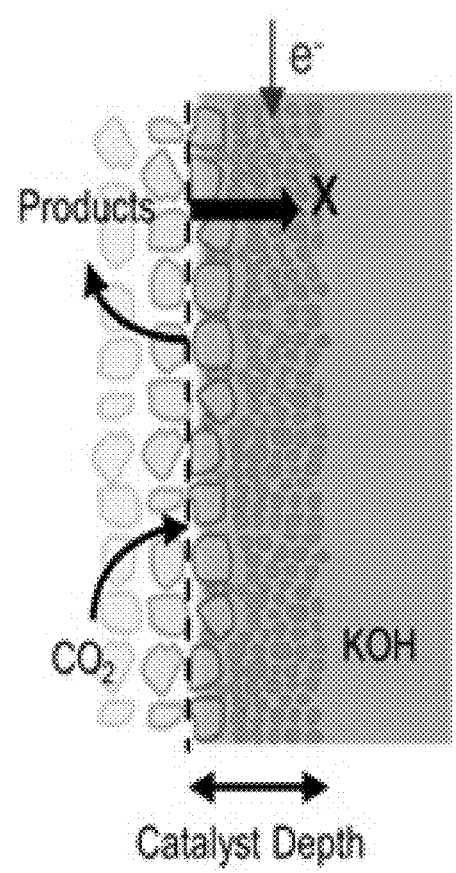
Figure 7F:
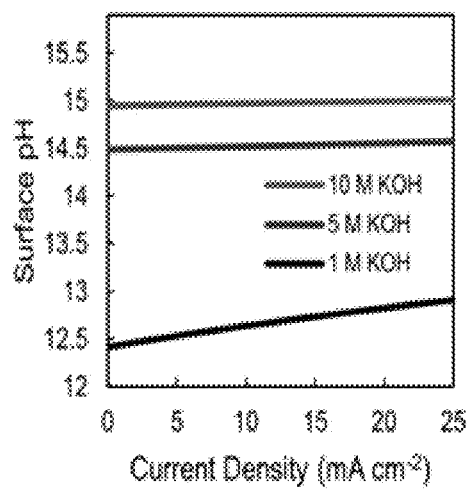
Figure 7G:
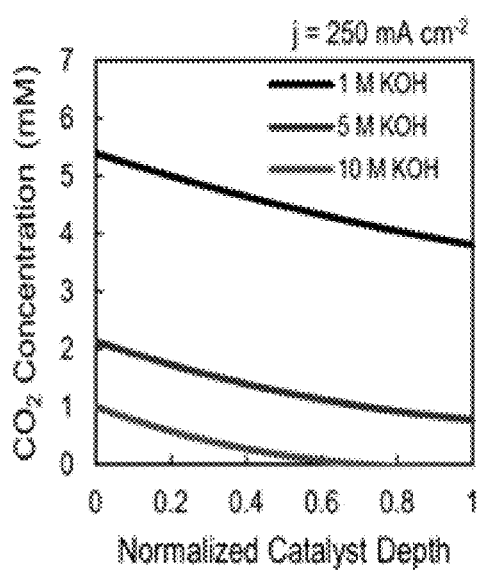
Figure 7H:
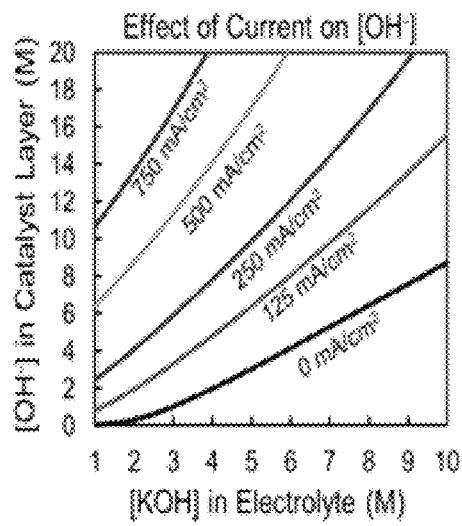
Figure 8A:
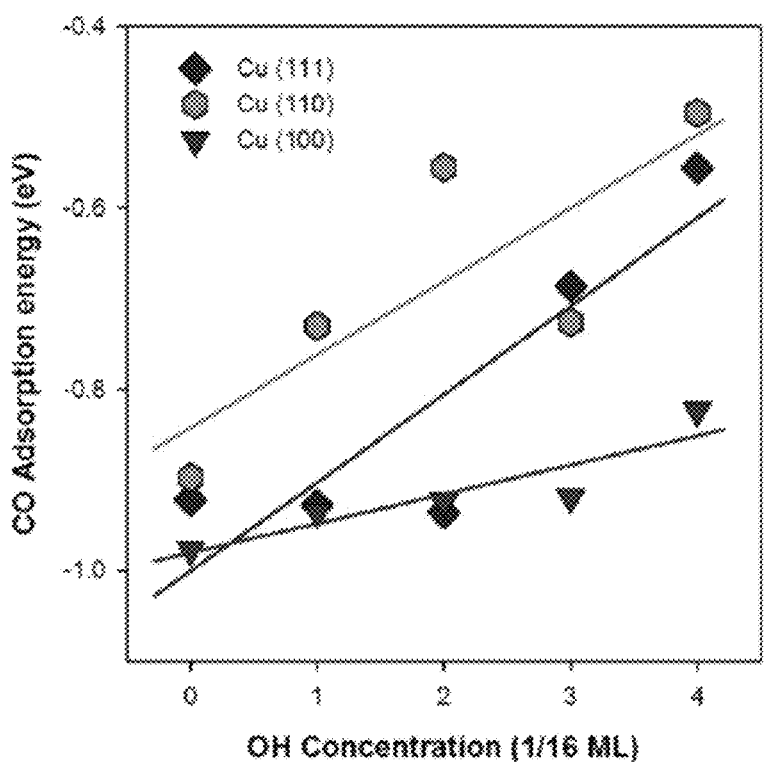
FIGS. 8a-8h are pictures and graphs depicting the effect of OH ion on CO binding energy and CO—CO coupling on Cu (100), (110) and (111) facets, without including explicit water molecules.
Figure 8B:
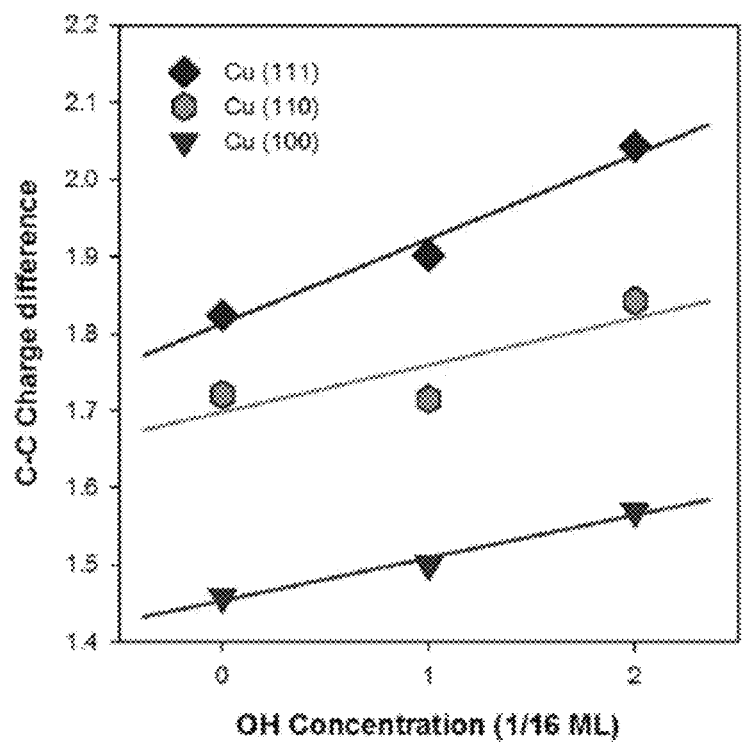
Figure 8C:
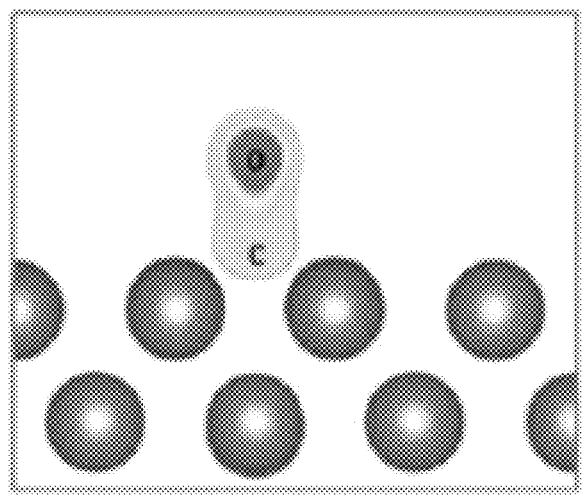
Figure 8D:
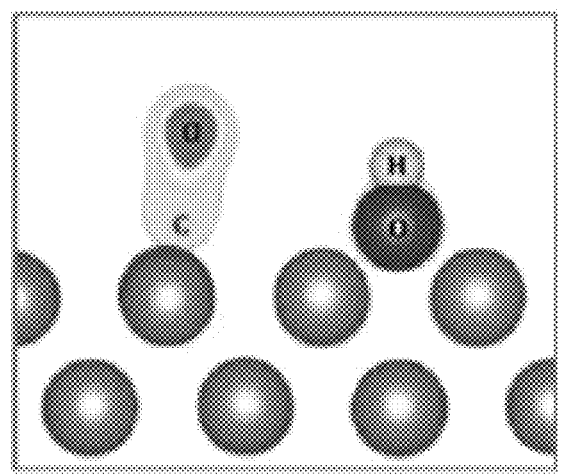
Figure 8E:
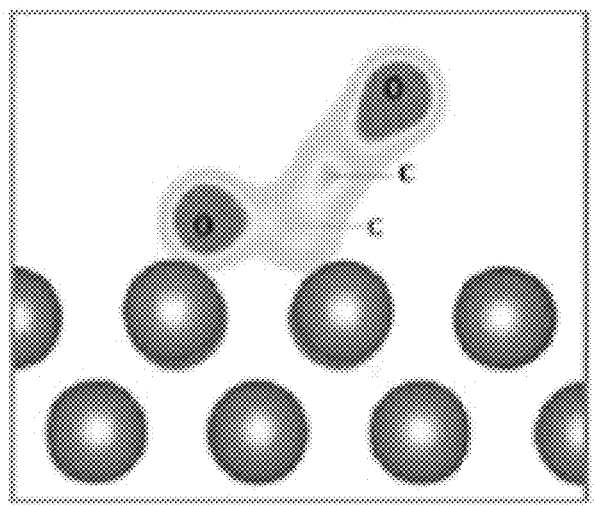
Figure 8F:
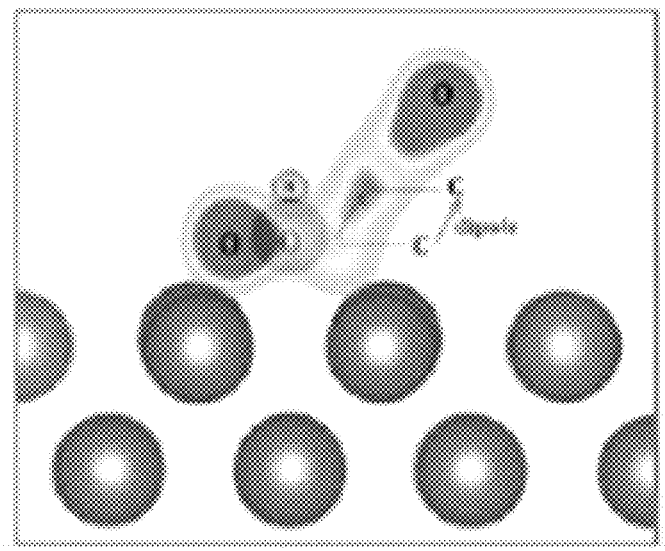
Figure 8G:
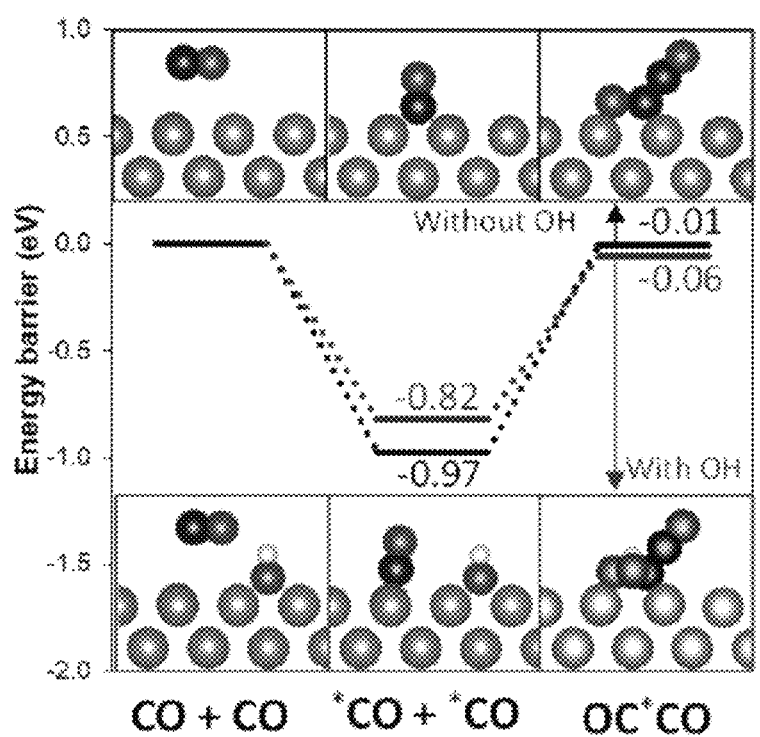
Figure 8H:
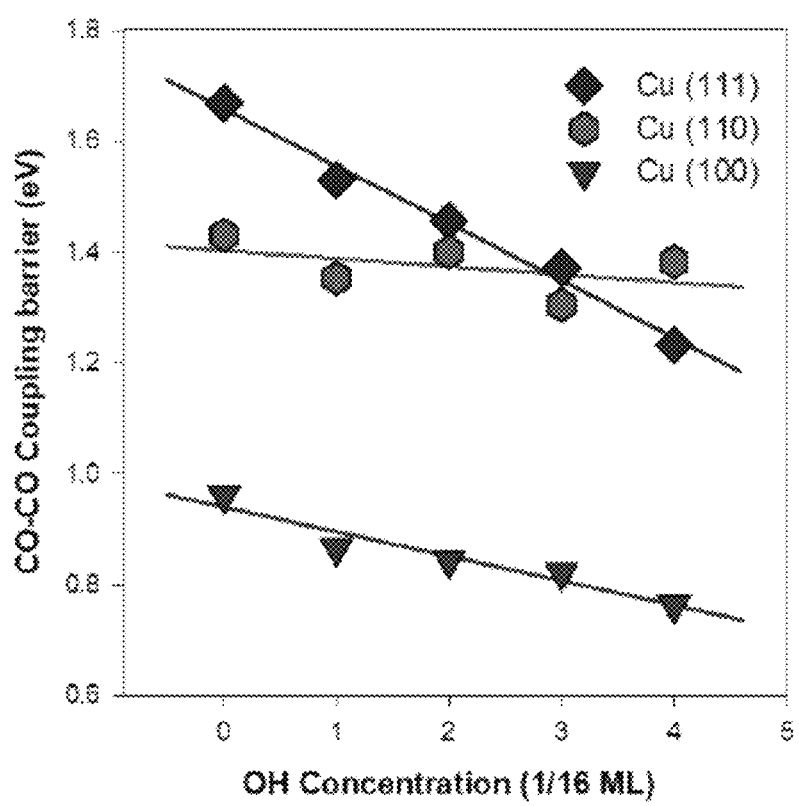

As shown in FIG. 7e, a gas-liquid interface is assumed at x=0 µm. The catalyst layer then extends into the electrolyte a specified thickness from this boundary. A liquid diffusion thickness of x=500 µm was assumed in our simulations as our cathode is recessed in a cavity of a similar depth due to the compression of a sealing gasket. The fluid outside of this cavity is assumed to be continuously mixed and replaced. A smaller diffusion thickness would slightly reduce the local reaction pH by providing a shorter diffusion distance of hydroxide to the bulk, but the bounds of this value depend on flow within the fluid channel. The maximum solubility of $CO_2$ in KOH electrolyte was modeled using Henry's constant and the Sechenov equation at 1 atm and 298 K to account for 'salting out' effects (FIG. 6b).

The catalyst layer porosity of 60% is based on a loosely packed spheres model while some fuel cell studies report porosities of 40%. The diffusion coefficient inside the simulated region was adjusted for porosity and viscosity. The assumption of a homogeneous reaction occurring laterally throughout the catalyst layer (Eq. (9)) is more accurate for lower current densities and thinner catalyst layers.

The following boundary conditions were used to solve the coupled equations. The left boundary condition of Eq. (5) was set as the solubility limit of $CO_2$ in a specified bulk KOH concentration, while a no-flux boundary condition was applied for $CO_2$ at the right-hand boundary. For $OH^-$, $HCO_3^-$ and $CO_3^{2-}$ no-flux boundary conditions were applied at the left boundary while the concentrations at the right boundary were set to the equilibrium values in the specified bulk KOH concentration. For all simulations we prescribe current density, selectivity, bulk KOH concentration and catalyst layer thickness.

From the solved system of equations, the concentration profile of $CO_2$ and $OH^-$ in the electrolyte can be found for a variety of inputs as shown in FIG. 1D and FIG. 7. As seen in FIG. 1D the KOH media is particularly parasitic to $CO_2$ and is neutralized by $OH^-$ well before the 500 μm liquid diffusion boundary, with or without a catalyst layer or current density imposed. The largest predicted correction from the bulk pH values occurs in 1 M KOH at 0 mA/cm² where the potential is adjusted using a pH of 12.42, instead of the bulk electrolyte pH (pH=14), equivalent to a 93 mV difference.

The invention can be further characterized with the following embodiments:

1st. Embodiment An electrocatalyst for reduction of $CO_2$ to produce multi-carbon compounds, the electrocatalyst comprising a multi-metal Cu—Al material.

2nd. Embodiment The electrocatalyst of embodiment 1, wherein the multi-metal Cu—Al material is a de-alloyed Cu—Al material.

3rd. Embodiment The electrocatalyst of embodiment 1 or 2, wherein the multi-metal Cu—Al material comprises 1 wt % to 50 wt % Al, or 3 wt % to 30 wt % Al.

4th. Embodiment The electrocatalyst of any one of embodiments 1 to 3, wherein the multi-metal Cu—Al material comprises 50 wt % to 99 wt % Cu, or 70 wt % to 97 wt % Cu.

5th. Embodiment The electrocatalyst of any one of embodiments 1 to 4, wherein the multi-metal Cu—Al material comprises Cu doped with Al.

6th. Embodiment The electrocatalyst of any one of embodiments 1 to 4, wherein the multi-metal Cu—Al material comprises Al doped with Cu.

7th. Embodiment The electrocatalyst of any one of embodiments 1 to 6, wherein the multi-metal Cu—Al material is formed as a catalytic layer.

8th. Embodiment The electrocatalyst of embodiment 7, wherein the catalytic layer is formed directly on a gas diffusion membrane.

9th. Embodiment The electrocatalyst of embodiment 7 or 8, wherein the catalytic layer has a thickness between 1 nm and 5000 nm.

10th. Embodiment The electrocatalyst of any one of embodiments 1 to 10, wherein the multi-metal Cu—Al material comprises Al-terminated pores.

11th. Embodiment The electrocatalyst of any one of embodiments 1 to 10, wherein the Al is ion-implanted into the Cu.

12th. Embodiment The electrocatalyst of any one of embodiments 1 to 10, wherein the Al is present in the Cu as Al that has been evaporated into the Cu and remains after chemically etching.

13th. Embodiment The electrocatalyst of any one of embodiments 1 to 12, wherein the Cu and Al in the multi-metal Cu—Al material are morphologically stable after five hours of electroreduction reaction in alkaline electrolyte.

14th. Embodiment The electrocatalyst of any one of embodiments 1 to 13, wherein Al concentration in the multi-metal Cu—Al material is stable after five hours of electroreduction reaction in alkaline electrolyte.

15th. Embodiment The electrocatalyst of any one of embodiments 1 to 14, wherein the multi-metal Cu—Al material comprises a surface region having a thickness between 1 nm and 3 nm.

16th. Embodiment The electrocatalyst of embodiment 15, wherein at least the surface region comprises an Al content of 1 wt % to 50 wt % and a Cu content of 50 wt % to 99 wt %, or comprises an Al content of 3 wt % to 30 wt % and a Cu content of 70 wt % to 97 wt %.

17th. Embodiment The electrocatalyst of embodiment 15 or 16, wherein at least the surface region is nanoporous.

18th. Embodiment The electrocatalyst of embodiment 17, wherein at least the surface region has pores that have pore sizes of 1 nm to 100 nm, or of 5 nm to 20 nm.

19th. Embodiment The electrocatalyst of any one of embodiments 15 to 18, wherein at least the surface region has a homogeneous distribution of Al and Cu.

20th. Embodiment The electrocatalyst of any one of embodiments 15 to 19, wherein the Cu in at least the surface region is Cu (111).

21st. Embodiment The electrocatalyst of embodiment 20, wherein the Al content in the Cu (111) is about 8 wt % to about 15 wt %, or about 11 wt % to about 13 wt %.

22nd. Embodiment The electrocatalyst of any one of embodiments 15 to 19, wherein the Cu in at least the surface region is Cu (100).

23rd. Embodiment The electrocatalyst of embodiment 22, wherein the Al content in the Cu (111) is about 3 wt % to about 15 wt %.

24th. Embodiment The electrocatalyst of any one of embodiments 15 to 23, wherein at least the surface region consists of Cu and Al.

25th. Embodiment The electrocatalyst of any one of embodiments 1 to 24, wherein the multi-metallic Cu—Al material consists of Cu and Al.

26th. Embodiment An electrocatalyst for reduction of $CO_2$ to produce multi-carbon compounds, the electrocatalyst comprising a multi-metal material comprising Cu and an enhancer metal that modifies Cu coordination environment that enhances C—C dimerization.

27th. Embodiment The electrocatalyst of embodiment 26, wherein the enhancer metal increases catalytic site density with decreased reaction energy for the C—C dimerization.

28th. Embodiment The electrocatalyst of embodiment 27, wherein the reaction energy for the C—C dimerization is decreased by 0.3 eV to 0.7 eV.

29th. Embodiment The electrocatalyst of any one of embodiments 26 to 28, wherein the multi-metal material is a de-alloyed material.

30th. Embodiment The electrocatalyst of any one of embodiments 26 to 29, wherein the multi-metal material comprises 1 wt % to 50 wt % of the enhancer metal, or 3 wt % to 30 wt % of the enhancer metal.

31st. Embodiment The electrocatalyst of any one of embodiments 26 to 30, wherein the multi-metal material comprises 50 wt % to 99 wt % Cu, or 70 wt % to 97 wt % Cu.

32nd. Embodiment The electrocatalyst of any one of embodiments 26 to 31, wherein the multi-metal material comprises the Cu doped with the enhancer metal.

33rd. Embodiment The electrocatalyst of any one of embodiments 26 to 32, wherein the multi-metal material comprises the enhancer metal doped with the Cu.

34th. Embodiment The electrocatalyst of any one of embodiments 26 to 33, wherein the multi-metal material is formed as a catalytic layer.

35th. Embodiment The electrocatalyst of embodiment 34, wherein the catalytic layer is formed directly on a gas diffusion membrane.

36th. Embodiment The electrocatalyst of embodiment 34 or 35, wherein the catalytic layer has a thickness between 1 nm and 5000 nm.

37th. Embodiment The electrocatalyst of any one of embodiments 34 to 36, wherein the multi-metal material comprises enhancer metal-terminated pores.

38th. Embodiment The electrocatalyst of any one of embodiments 26 to 37, wherein the enhancer metal is ion-implanted into the Cu.

39th. Embodiment The electrocatalyst of any one of embodiments 26 to 37, wherein the enhancer metal is present in the Cu as enhancer metal evaporated into the Cu and remains after chemically etching.

40th. Embodiment The electrocatalyst of any one of embodiments 26 to 39, wherein the Cu and the enhancer metal in the multi-metal material are morphologically stable after five hours of electroreduction reaction in alkaline electrolyte.

41st. Embodiment The electrocatalyst of any one of embodiments 26 to 40, wherein enhancer metal concentration in the multi-metal material is stable after five hours of electroreduction reaction in alkaline electrolyte.

42nd. Embodiment The electrocatalyst of any one of embodiments 26 to 41, wherein the multi-metal material comprises a surface region having a thickness between 1 nm and 3 nm.

43rd. Embodiment The electrocatalyst of embodiment 42, wherein at least the surface region comprises an enhancer metal content of 1 wt % to 50 wt % and a Cu content of 50 wt % to 99 wt %, or comprises an enhancer metal content of 3 wt % to 30 wt % and a Cu content of 70 wt % to 97 wt %.

44th. Embodiment The electrocatalyst of embodiment 42 or 43, wherein at least the surface region is nanoporous.

45th. Embodiment The electrocatalyst of embodiment 44, wherein at least the surface region has pores that have pore sizes of 1 nm to 100 nm, or of 5 nm to 20 nm.

46th. Embodiment The electrocatalyst of any one of embodiments 42 to 45, wherein at least the surface region has a homogeneous distribution of enhancer metal and Cu.

47th. Embodiment The electrocatalyst of any one of embodiments 42 to 46, wherein the Cu in at least the surface region is Cu (111).

48th. Embodiment The electrocatalyst of embodiment 47, wherein the enhancer metal content in the Cu (111) is about 8 wt % to about 15 wt %, or about 11 wt % to about 13 wt %.

49th. Embodiment The electrocatalyst of any one of embodiments 42 to 46, wherein the Cu in at least the surface region is Cu (100).

50th. Embodiment The electrocatalyst of embodiment 49, wherein the enhancer metal content in the Cu (111) is about 3 wt % to about 15 wt %.

51st. Embodiment The electrocatalyst of any one of embodiments 42 to 50, wherein at least the surface region consists of the Cu and the enhancer metal.

52nd. Embodiment The electrocatalyst of any one of embodiments 26 to 51, wherein the multi-metallic material consists of the Cu and the enhancer metal.

53rd. Embodiment The electrocatalyst of any one of embodiments 26 to 52, wherein the enhancer metal comprises or consists of Al.

54th. Embodiment An electrocatalyst for reduction of $CO_2$ to produce multi-carbon compounds, the electrocatalyst comprising a multi-metal material comprising a primary catalyst metal and an enhancer metal that modifies coordination environment of the primary catalyst metal so as to enhance C—C dimerization.

55th. Embodiment The electrocatalyst of embodiment 54, wherein the enhancer metal increases catalytic site density with decreased reaction energy for the C—C dimerization.

56th. Embodiment The electrocatalyst of embodiment 55, wherein the reaction energy for the C—C dimerization is decreased by 0.3 eV to 0.7 eV.

57th. Embodiment The electrocatalyst of any one of embodiments 54 to 56, wherein the multi-metal material is a de-alloyed material.

58th. Embodiment The electrocatalyst of any one of embodiments 54 to 57, wherein the multi-metal material comprises 1 wt % to 50 wt % of the enhancer metal, or 3 wt % to 30 wt % of the enhancer metal.

59th. Embodiment The electrocatalyst of any one of embodiments 54 to 58, wherein the multi-metal material comprises 50 wt % to 99 wt % of the primary catalytic metal, or 70 wt % to 97 wt % of the primary catalytic metal.

60th. Embodiment The electrocatalyst of any one of embodiments 54 to 59, wherein the multi-metal material comprises the primary catalytic metal doped with the enhancer metal.

61st. Embodiment The electrocatalyst of any one of embodiments 54 to 59, wherein the multi-metal material comprises the enhancer metal doped with the primary catalytic metal.

62nd. Embodiment The electrocatalyst of any one of embodiments 54 to 61, wherein the multi-metal material is formed as a catalytic layer.

63rd. Embodiment The electrocatalyst of embodiment 62, wherein the catalytic layer is formed directly on a gas diffusion membrane.

64th. Embodiment The electrocatalyst of embodiment 62 or 63, wherein the catalytic layer has a thickness between 1 nm and 5000 nm.

65th. Embodiment The electrocatalyst of any one of embodiments 62 to 64, wherein the multi-metal material comprises enhancer metal-terminated pores.

66th. Embodiment The electrocatalyst of any one of embodiments 54 to 65, wherein the enhancer metal is ion-implanted into the primary catalytic metal.

67th. Embodiment The electrocatalyst of any one of embodiments 54 to 65, wherein the enhancer metal is present in the primary catalytic metal as enhancer metal evaporated into the primary catalytic metal and remains after chemically etching.

68th. Embodiment The electrocatalyst of any one of embodiments 54 to 67, wherein the primary catalytic metal and the enhancer metal in the multi-metal material are morphologically stable after five hours of electroreduction reaction in alkaline electrolyte.

69th. Embodiment The electrocatalyst of any one of embodiments 54 to 68, wherein enhancer metal concentration in the multi-metal material is stable after five hours of electroreduction reaction in alkaline electrolyte.

70th. Embodiment The electrocatalyst of any one of embodiments 54 to 69, wherein the multi-metal material comprises a surface region having a thickness between 1 nm and 3 nm.

71st. Embodiment The electrocatalyst of embodiment 70, wherein at least the surface region comprises an enhancer metal content of 1 wt % to 50 wt % and a primary catalytic metal content of 50 wt % to 99 wt %, or comprises an enhancer metal content of 3 wt % to 30 wt % and a primary catalytic metal content of 70 wt % to 97 wt %.

72nd. Embodiment The electrocatalyst of embodiment 70 or 71, wherein at least the surface region is nanoporous.

73rd. Embodiment The electrocatalyst of embodiment 72, wherein at least the surface region has pores that have pore sizes of 1 nm to 100 nm, or of 5 nm to 20 nm.

74th. Embodiment The electrocatalyst of any one of embodiments 70 to 73, wherein at least the surface region has a homogeneous distribution of enhancer metal and the primary catalytic metal.

75th. Embodiment The electrocatalyst of any one of embodiments 70 to 74, wherein the primary catalytic metal in at least the surface region is has a (111) structure.

76th. Embodiment The electrocatalyst of embodiment 75, wherein the enhancer metal content is about 8 wt % to about 15 wt %, or about 11 wt % to about 13 wt %.

77th. Embodiment The electrocatalyst of any one of embodiments 70 to 76, wherein the primary catalytic metal in at least the surface region has a (100) structure.

78th. Embodiment The electrocatalyst of embodiment 49, wherein the enhancer metal content is about 3 wt % to about 15 wt %.

79th. Embodiment The electrocatalyst of any one of embodiments 70 to 78, wherein at least the surface region consists of the primary catalytic metal and the enhancer metal.

80th. Embodiment The electrocatalyst of any one of embodiments 54 to 79, wherein the multi-metallic material consists of the primary catalytic metal and the enhancer metal.

81st. Embodiment The electrocatalyst of any one of embodiments 54 to 80, wherein the enhancer metal comprises or consists of Al.

82nd. Embodiment The electrocatalyst of any one of embodiments 54 to 81, wherein the primary catalytic metal comprises or consists of Cu.

83rd. Embodiment The electrocatalyst of any one of embodiments 54 to 82, comprising one or more features as defined in any one of embodiments 1 to 53 or as described herein.

84th. Embodiment Use of the electrocatalyst as defined in any one of embodiments 1 to 83 for electrocatalytic reduction of $CO_2$ into at least one multi-carbon compound.

85th. Embodiment The use of embodiment 84, wherein the at least one multi-carbon compound comprises ethylene.

86th. Embodiment The use of embodiment 84 or 85, wherein the electrocatalytic reduction of $CO_2$ is performed in an alkaline medium.

87th. Embodiment The use of embodiment 86, wherein the alkaline medium comprises potassium hydroxide.

88th. Embodiment The use of any one of embodiments 84 to 87, wherein the electrocatalytic reduction of $CO_2$ is performed in a three-electrode flow-cell.

89th. Embodiment A process for electrochemical production of a multi-carbon compound from $CO_2$, comprising:
contacting $CO_2$ gas and an electrolyte with an electrode comprising the electrocatalyst as defined in any one of embodiments 1 to 83, such that the $CO_2$ contacts the electrocatalyst;
applying a voltage to provide a current density to cause the $CO_2$ gas contacting the electrocatalyst to be electrochemically converted into the multi-carbon compound; and
recovering the multi-carbon compound.

90th. Embodiment The process of embodiment 89, wherein the current density provided in the current collection structure is predetermined for selective electrochemical conversion of the $CO_2$ into a target multi-carbon compound.

91st. Embodiment The process of embodiment 89 or 90, wherein the target multi-carbon compound is ethylene or an alcohol.

92nd. Embodiment The process of any one of embodiments 89 to 91, wherein the electrolyte comprises an alkaline compound.

93rd. Embodiment The process of any one of embodiments 89 to 92, wherein the electrolyte comprises KOH and/or other alkaline solutions.

94th. Embodiment The process of any one of embodiments 89 to 93, conducted in a three-electrode flow-cell.

95th. Embodiment A system for $CO_2$ electroreduction to produce multi-carbon hydrocarbons, comprising:
an electrolytic cell configured to receive a liquid electrolyte and $CO_2$ gas;
an anode;
a cathode comprising an electrocatalyst as defined in any one of embodiments 1 to 83; and
a voltage source to provide a current density to cause the $CO_2$ gas contacting the electrocatalyst to be electrochemically converted into the multi-carbon hydrocarbon, which is optionally ethylene or an alcohol.

96th. Embodiment A method of manufacturing the electrocatalyst of any one of embodiments 1 to 83 comprising vapour-phase deposition followed by chemical etching or ion-implanting.

97th. Embodiment A method of manufacturing an electrocatalyst for reduction of $CO_2$ to produce multi-carbon compounds, the method comprising:
producing a metallic material comprising Cu and Al; and
subjecting the metallic material to chemical etching to remove a portion of the Al from a surface region of the metallic alloy to produce a de-alloyed Cu—Al material.

98th. Embodiment The method of embodiment 97, wherein producing the metallic material comprises vapour-phase deposition of Al onto a Cu surface.

99th. Embodiment The method of embodiment 98, wherein the vapour-phase deposition comprising evaporating solid Al and forming a deposited Al layer on the Cu surface to form an evaporated Al-on-Cu material.

100th. Embodiment The method of embodiment 99, wherein the deposited Al layer has a thickness of about 50 to 150 nm.

101st. Embodiment The method of embodiment 99 or 100, wherein the evaporating of the solid Al is performed at an evaporation rate of approximately 1-10 nm s$^{-1}$, 1-5 nm s$^{-1}$ or 1-2 nm s$^{-1}$.

102nd. Embodiment The method of embodiment 101, wherein the evaporating of the solid Al is performed at under a base pressure of about 10$^{-5}$ to 10$^{-8}$ Torr.

103rd. Embodiment The method of any one of embodiments 98 to 102, wherein the chemical etching comprises immersing the evaporated Al-on-Cu material into an acidic solution to remove Al.

104th. Embodiment The method of embodiment 103, wherein the acidic solution comprises hydrochloric acid solution.

105th. Embodiment The method of embodiment 103 or 104, wherein the hydrochloric acid solution comprises about 1-20 wt % or 1-5 wt % hydrochloric acid.

106th. Embodiment The method of any one of embodiments 103 to 105, further comprising, after chemical etching, washing with water to remove the acidic solution.

107th. Embodiment The method of embodiment 106, further comprising, after washing, air drying to remove water.

108th. Embodiment The method of any one of embodiments 98 to 107, further comprising, prior to producing the metallic alloy comprising the Cu and Al, depositing Cu on a gas diffusion layer (GDL).

109th. Embodiment The method of embodiment 108, wherein the Cu is deposited by thermal evaporation onto the GDL.

110th. Embodiment The method of embodiment 108 or 109, wherein the Cu forms a deposited Cu layer on the GDL.

111th. Embodiment The method of embodiment 110, wherein the deposited Cu layer has a thickness of about 400 to 600 nm.

112th. Embodiment The method of embodiment 97, wherein producing the metallic material comprises co-evaporation of Al and Cu to form a Cu—Al alloy.

113th. Embodiment The method of embodiment 112, further comprising depositing a layer of the Cu—Al alloy onto a gas diffusion layer (GDL) prior to the chemical etching.

114th. Embodiment The method of embodiment 113, further comprising cooling the deposited Cu—Al alloy prior to chemical etching.

115th. Embodiment The method of any one of embodiments 112 to 114, wherein the chemical etching comprises immersing the Cu—Al alloy in an acidic solution to remove Al.

116th. Embodiment The method of embodiment 115, wherein the acidic solution comprises hydrochloric acid solution.

117th. Embodiment The method of embodiment 115 or 116, further comprising, after chemical etching, washing with water to remove the acidic solution.

118th. Embodiment A method of manufacturing an electrocatalyst for reduction of CO$_2$ to produce multicarbon compounds, the method comprising ion-implanting Al into Cu.

The invention claimed is:

1. A composite multilayer carbon dioxide (CO$_2$) reduction catalyst, comprising:
a catalyst layer comprising at least one metal compound, the catalyst layer having opposed first and second sides;
a hydrophobic gas-diffusion layer provided on the first side of the catalyst layer wherein the hydrophobic gas-diffusion layer is an electrically insulating polymeric material;
a current collection structure provided on the second side of the catalyst layer wherein the catalyst layer comprises copper.

2. The multilayer CO$_2$ reduction composite catalyst according to claim 1 characterized in that the hydrophobic gas-diffusion layer has:
a porosity with pores having a diameter ranging from 0.01 to 2 micrometers as determined by scanning electron microscopy; or
a thickness ranging between 20 and 500 micrometers as determined by scanning electron microscopy.

3. The multilayer CO$_2$ reduction composite catalyst according to claim 1, characterized in that the catalyst layer is disposed directly on the hydrophobic gas-diffusion layer.

4. The multilayer CO$_2$ reduction composite catalyst according to claim 1, characterized in that:
the catalyst layer has a thickness ranging between 1 and 2000 nm as determined by scanning electron microscopy; or
the current collection structure has a thickness ranging between 1 to 100 micrometers as determined by scanning electron microscopy.

5. The multilayer CO$_2$ reduction composite catalyst according to claim 1, characterized in that the current collection structure comprises:
a stabilization layer disposed on the catalyst layer, and
a current collection layer disposed on the stabilization layer.

6. The multilayer CO$_2$ reduction composite catalyst according to claim 5, characterized in that the stabilization layer comprises carbon nanoparticles; or the current collection layer comprises graphite and forms a graphite electrode layer.

7. The multilayer CO$_2$ reduction composite catalyst according to claim 1, characterized in that the current collection structure is composed of at least one electrically conductive carbon compound.

8. The multilayer CO$_2$ reduction composite catalyst according to claim 1, wherein the hydrophobic gas diffusion layer is a fluorocarbon polymer.

9. The multilayer CO$_2$ reduction composite catalyst according to claim 1, wherein the hydrophobic gas diffusion layer is polytetrafluoroethylene.

10. The multilayer CO$_2$ reduction composite catalyst according to claim 1, wherein the hydrophobic gas diffusion layer has a porosity with pores having a diameter ranging from 0.01 to 2 micrometers as determined by scanning electron microscopy.

11. A fuel cell comprising a reaction cell receiving an electrolyte;
an oxygen evolution catalyst; and
a composite multilayer CO$_2$ reduction catalyst according to claim 1.

12. A system for CO$_2$ reduction, comprising:
an electrolytic cell configured to receive a liquid electrolyte and CO$_2$ gas;
an anode;
a cathode comprising a composite multilayer CO$_2$ reduction catalyst as defined in claim 1.

13. Use of the composite multilayer CO$_2$ reduction catalyst according to claim 1 in a fuel cell or for production of a hydrocarbon product.

14. A method for electrochemical production of a hydrocarbon product, comprising:
  a) contacting $CO_2$ gas and an electrolyte with an electrode comprising the multilayer $CO_2$ reduction composite catalyst according to claim 1, such that the $CO_2$ gas diffuses through the hydrophobic gas-diffusion layer and contacts the catalyst layer;
  b) applying a voltage to provide a current density in the current collection structure of the multilayer $CO_2$ reduction composite catalyst to cause the $CO_2$ gas contacting the catalyst layer to be electrochemically converted into the hydrocarbon product; and
  c) recovering the hydrocarbon product.

15. The method according to claim 14, characterized in that the current density provided in the current collection structure is at least 100 mA/cm 2 for selective electrochemical conversion of the $CO_2$ into a target hydrocarbon product being ethylene.

16. The method according to claim 14, wherein the electrolyte comprises KOH.

17. A method of reducing flooding of a $CO_2$ gas-diffusion membrane used in a $CO_2$ reduction composite catalyst comprising a metal catalyst and a current collection material for converting $CO_2$ into chemical compounds, the method comprising decoupling the $CO_2$ gas-diffusion membrane from the current collection material, characterized in that the $CO_2$ reduction composite catalyst is according to claim 1.

18. A method of manufacturing a composite multilayer $CO_2$ reduction catalyst according to claim 1, comprising:
  depositing a catalyst material onto a hydrophobic gas-diffusion layer to provide a catalyst layer thereon;
  affixing current collection material to the catalyst layer to form a current collection structure thereon, wherein the current collection structure and the hydrophobic gas-diffusion layer are decoupled such that the hydrophobic gas-diffusion layer maintains hydrophobicity during operation.

19. The method according to claim 18, further comprising:
  coating an exposed surface of the catalyst layer with a conductive stabilization material to form a stabilization layer that is electrically connected to the catalyst material; and
  affixing a conductive material to an exposed surface of the stabilization layer to provide a current collection layer thereon, such that the current collection structure comprises the stabilization layer and the current collection layer.

20. The method according to claim 18, characterized in that the step of depositing the catalyst material onto the hydrophobic gas-diffusion layer is performed using a physical deposition method.

21. The method according to claim 18, characterized in that:
  the hydrophobic gas-diffusion layer is composed of an electrically insulating material which is a polymeric material.

22. The method according to claim 18, characterized in that the current collection material is or comprises graphite and in that graphite is applied to the catalyst layer to form a single graphite layer as the current collection structure.

* * * * *